(12) United States Patent
Ruelberg et al.

(10) Patent No.: US 10,984,548 B2
(45) Date of Patent: Apr. 20, 2021

(54) YIELD PREDICTION FOR A CORNFIELD

(71) Applicant: BASF Agro Trademarks GmbH, Ludwighafen am Rhein (DE)

(72) Inventors: Klaus Ruelberg, Cologne (DE); Gregor Fischer, Overath (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 82 days.

(21) Appl. No.: 16/342,363

(22) PCT Filed: Oct. 16, 2017

(86) PCT No.: PCT/EP2017/076320
§ 371 (c)(1),
(2) Date: Apr. 16, 2019

(87) PCT Pub. No.: WO2018/073163
PCT Pub. Date: Apr. 26, 2018

(65) Prior Publication Data
US 2019/0286904 A1   Sep. 19, 2019

(30) Foreign Application Priority Data

Oct. 19, 2016 (EP) .................................... 16194686
Oct. 19, 2016 (EP) .................................... 16194687

(51) Int. Cl.
*G06K 9/00* (2006.01)
*G06T 7/60* (2017.01)
(Continued)

(52) U.S. Cl.
CPC ............ *G06T 7/60* (2013.01); *G06K 9/00657* (2013.01); *G06K 9/6202* (2013.01); *G06Q 50/02* (2013.01);
(Continued)

(58) Field of Classification Search
CPC ...... A01G 7/00; A01G 22/00; G06K 9/00657; G06K 9/00671; G06K 9/46; G06K 9/6202;
(Continued)

(56) References Cited

U.S. PATENT DOCUMENTS

2014/0176705 A1   6/2014   Ibamoto
2016/0216245 A1*  7/2016   Sutton ................ G06K 9/00664
(Continued)

FOREIGN PATENT DOCUMENTS

CN    101944231 A    1/2011
CN    103632157 A    3/2014
(Continued)

OTHER PUBLICATIONS

International Search Report for PCT/EP2017/076035 dated Nov. 23, 2017.
(Continued)

*Primary Examiner* — Jose L Couso
(74) *Attorney, Agent, or Firm* — Lowenstein Sandler LLP

(57) ABSTRACT

A method for predicting the yield of a cornfield is presented. The method has the steps of positioning a digital camera at a defined distance above an average plane of ears of a cornfield, capturing a digital image of a section of the cornfield, determining the area of the captured cornfield section, determining the total area of the ears in the digital image compared to the total area of the digital image, and determining the yield of the field from the total area of the ears in the digital image compared to the total area of the digital image, the determined area of the captured cornfield section, the average grain weight of an ear, a total field area and a calibration factor.

18 Claims, 15 Drawing Sheets

(51) Int. Cl.
G06Q 50/02 (2012.01)
G06T 7/194 (2017.01)
G06T 7/90 (2017.01)
G06K 9/62 (2006.01)
G06T 7/62 (2017.01)

(52) U.S. Cl.
CPC .............. *G06T 7/194* (2017.01); *G06T 7/90* (2017.01); *G06T 7/62* (2017.01); *G06T 2207/10004* (2013.01); *G06T 2207/10024* (2013.01); *G06T 2207/30188* (2013.01)

(58) Field of Classification Search
CPC .......... G06K 9/62; G06K 9/0063; G06K 9/52; G06K 2209/17; G06T 2207/30188; G06T 2207/30128; G06T 2207/10004; G06T 2207/10048; G06T 2207/10024; G06T 2207/10036; G06T 7/0004; G06T 7/001; G06T 7/0002; G06T 7/50; G06T 7/60; G06T 7/74; G06T 7/75; G06T 7/90; G06T 7/194; G06T 7/11; G06Q 50/02; G06Q 10/06; G06Q 10/04; G06Q 10/06315; G06Q 10/06313; G06Q 10/06375; G01N 33/0098; G01N 33/025; G01N 2021/0118; G01N 2021/1797; G01N 2021/8466; G01N 21/251; G01N 21/255; G01N 21/314; G01N 21/359; G01N 21/25; H04N 5/232; H04N 5/23229; H04N 5/332; H04N 2201/3252; G01J 2003/2826; G01J 3/36; G01J 3/513; G01J 3/51; G01C 11/02; A01C 21/007; A01C 21/00; A01B 79/005; G06F 30/20
See application file for complete search history.

(56) References Cited

U.S. PATENT DOCUMENTS

| | | | |
|---|---|---|---|
| 2016/0223507 A1 | 8/2016 | Li et al. | |
| 2016/0239709 A1* | 8/2016 | Shriver | G06K 9/00657 |
| 2016/0283791 A1 | 9/2016 | Ogura et al. | |
| 2017/0024876 A1* | 1/2017 | Young | G06Q 50/02 |
| 2018/0108123 A1* | 4/2018 | Baurer | A01G 7/00 |
| 2018/0253600 A1* | 9/2018 | Ganssle | G06K 9/00657 |
| 2020/0104988 A1* | 4/2020 | Baurer | G06F 16/5866 |

FOREIGN PATENT DOCUMENTS

| | | |
|---|---|---|
| EP | 2752807 A1 | 7/2014 |
| EP | 2752808 A1 | 7/2014 |

OTHER PUBLICATIONS

International Search Report for PCT/EP2017/076320 dated Oct. 16, 2017.
Written Opinion of the International Searching Authority for PCT/EP2017/076035 dated Nov. 23, 2017.
Written Opinion of the International Searching Authority for PCT/EP2017/076320 dated Oct. 16, 2017.
"Image segmentation", Wikipedia, retrieved on Jul. 9,2019, XP055422415, 16 pages, (URL: https://en.wikipedia.org/wiki/Image_segmentation).
"Template matching", Wikipedia, retrieved on Jul. 9, 2019, XP055420656, 4 pages, (URL: https://en.wikipedia.org/wiki/Template_matching).
Du, et al., "Three-Dimensional Reconstruction and Characteristics Computation of Corn Ears Based on Machine Vision", International Conference on Computer and Computing Technologies in Agriculture, CCTA 2013: Computer and Computing Technologies in Agriculture VII, 2014, pp. 290-300.
Guérin, D., "Feasibility study of a wheatears counting vision system", Proceedings of the Complex Systems Intelligence and Modern Technology Applications, 2004, pp. 658-664.
Kenneth Dawson-Howe, "A Practical Introduction to Computer Vision with OpenCV ", Wiley-IS&T Series in Imaging Science and Technology, May 12, 2014, 234 pages.
PixelFusion3D, "Measuring Ear of Wheat", Mar. 27, 2016, Photo ID: 516684148, XP055421928, (URL: https://www.istockphoto.com/fi/photo/measuring-ear-of-wheat-gm516684148-89099059).
Susan McGinley, "Regulation of Early Endosperm Development in Maize", Agricultural Experiment Station Research Report, the University of Arizona, Nov. 13, 2009, 3 pages.
Wizthings, "Photographic Scale ASC 2", Mar. 17, 2014, Model No. PS-ASC2-001, ASIN B00J2ABBBQ, XP055421923, (URL: https://www.amazon.co.uk/Wizthings-Photographic-Scale-ASC-2/dp/BOOJ2ABBBQ/).
Zambanini, et al., "Chaper 11—an Automatic Method to Determinethe Diameter of Historical Coins in Images", Scientific Computing and Cultural Heritage: Contributions in Computational Humanities (Contributions in Mathematical and Computational Sciences), ed. Bock, et al., 2012, pp. 99-106.
U.S. Appl. No. 16/342,341, filed Apr. 16, 2019.
"Local binary patterns", Wikipedia, retrieved on Jul. 16, 2019, 4 pages. (URL:https://en.wikipedia.org/wiki/Local_binary_patterns).
"Selfie stick", Wikipedia, retrieved on Jul. 16, 2019, 6 pages. (URL:https://en.wikipedia.org/wiki/Selfie_stick).
Bakhouche, et al., "Texture analysis with statistical methods for wheat ear extraction", Proceedings SPIE 6356, Eighth International Conference on Quality Control by Artificial Vision, May 23, 2007, 8 pages.
Cointault, et al., "Improvements of image processing for wheat ear counting", International Conference on Agricultural Engineering & Industry Exhibition, Jun. 25, 2008, 11 pages.
Cointault, et al., "Infield Triticum aestivum ear counting using colourtexture image analysis", New Zealand Journal of Crop and Horticultural Science, vol. 36, Issue 2, 2008, pp. 117-130.
European Search Report for EP Patent Application No. 16194687.6, dated Apr. 11, 2017, 3 pages.
Frederic, et al., "Texture, Color and Frequential Proxy-Detection Image Processing for Crop Characterization in a Context of Precision Agriculture", Agricultural Science, ed. Dr. Godwin Aflakpui, Apr. 2012, pp. 49-70.
Guérin, et al., "Feasibility study of a wheatears counting vision system", CSIMTA: Proceedings of the Complex systems, Intelligence and Modern Technology applications, Sep. 22, 2004, pp. 658-664.
He, et al., "Texture Unit, Texture Spectrum. and texture Analysis", IEEE Transactions on Geoscience and Remote Sensing, vol. 28, Issue 4, Jul. 1990, pp. 509-512.
Jones, et al., "Remote Sensing of Vegetation: Principles, Techniques, and Applications", Oxford University Press, U.S.A, Sep. 10, 2010, p. 92, pp. 94-95, 99-100, 104-105, 283-287.
Journaux, et al., "Fourier Filtering for Wheat Detection in a Context of Yield Prediction", XVIIth World Congress of the International Commission of Agricultural and Biosystems Engineering (CIGR), Jun. 13-17, 2010, 9 pages.
Kim, et al., "Automatic spike detection based on adaptive template matching for extracellular neural recordings", Journal of Neuroscience Methods, vol. 165, issue 2, Sep. 30, 2007, pp. 165-174.
Petr, et al., "Yield formation in the main field crops", Elsevier, 1988, pp. 151-153.
Topi, et al., "Texture classification by multi-predicate local binary pattern operators", Proceedings 15th International Conference on Pattern Recognition. ICPR-2000, Sep. 3-7, 2000, pp. 951-954.

* cited by examiner

100

102 Positioning of a digital camera

104 Recording of a digital image
of a corn field section

106 Determination of an area
of the recorded corn field section

108 Determination of a total area
of the ears in the digital image

110 Determination of a field yield

602 Recording of a digital image of an ear

↓

604 Determination of a length of the ear

606 Comparison with corner marks

↓

608 Determination of a number of spindle steps of the ear

↓

610 Determination of a number of grains

↓

612 Determination of the weight of all of the grains of an ear

FIG. 6

YIELD PREDICTION FOR A CORNFIELD

CROSS-REFERENCE TO RELATED APPLICATIONS

This application is a national stage application (under 35 U.S.C. § 371) of PCT/EP2017/076320, filed Oct. 16, 2017, which claims benefit of European Application Nos. 16194686.8 and 16194687.6, both filed Oct. 19, 2016, both of which are incorporated herein by reference in their entirety.

The invention generally relates to prediction of a yield of a harvest and in particular to a method for predicting the yield of a cornfield. The invention further relates to a corresponding system for predicting the yield of a cornfield and to a computer system relating thereto.

Now that automation of classic production areas in industrial manufacturing is well advanced, this trend is now continuing in the classic agricultural field. Although the use of monitoring technology is not yet the universal standard in agricultural production processes, there is progress in this area as well. In many cases, classic industry 4.0 technologies can also be applied to agricultural processes and machines. In this case, however, at least one factor must be taken into consideration: the selected technologies should be easy to manage and robust. Moreover, the technologies used must be economical, as price pressure is also continuously mounting in production plants due to globalization.

Now and then, on the other hand, there are still reservations with respect to the use of high technology on farms, as dealing with these technologies is not part of standard knowledge in this field. Accordingly, information technology to be used in agricultural businesses must allow simple and intuitive operation.

Depending on the country, there are indeed several regions of the world in which highly sophisticated smart farming or digital farming initiatives are already in place, some of which have also achieved a high degree of automation in field work; with relatively little expense, however, it is possible to achieve considerable improvements if analysis techniques supported by image processing and information technology are made available in simple form and on a broad scale. This can be implemented most favorably in the form of technologies that have already penetrated into the daily life of the population.

Few quantitative parameters have been used to date in predicting yields in agriculture—in particular in predicting yields of cornfields. In most cases, these are still empirical values. In addition to reliable weather data, further analysis techniques would also be helpful in allowing famers to make highly precise predictions with respect to their crop yields in order to decide the best time for harvesting. In this way, it would be possible for producers to take advantage of customer purchase price fluctuations—such as e.g. those of agricultural cooperatives or industrial bulk purchasers—in order to optimize profits.

Accordingly, there is a need for improved yield prediction in cornfields and other agriculturally used surfaces. The subject matter of the present document addresses this objective.

The object of this application is achieved by means of the subject matter of the independent claims. Further examples are given in the respective dependent claims.

According to a first aspect of the present invention, a method is presented for predicting the yield of a cornfield. The method can comprise positioning a digital camera at a defined distance above an average plane of ears of a cornfield and capturing a digital image of a section of the cornfield with the positioned digital camera. The average plane of the ears can lie parallel to an image plane of the digital camera.

Furthermore, the method can comprise determining the area of the captured cornfield section from the defined distance and a viewing angle of the digital camera and determining the total area of the ears in the digital image compared to the total area of the digital image by means of an algorithm for differentiating between image pixels of the ears and other image pixels that do not belong to ears.

In addition, the method can comprise determining the yield of the field from the total area of the ears in the digital image. This can be carried out compared to the total area of the digital image, the determined area of the captured cornfield section, the average grain weight of an ear, a total field area and a first calibration factor.

According to a further aspect of the invention, a system for predicting the yield of a cornfield is presented. The system can comprise a digital camera that is positioned at a defined distance above an average plane of ears of a cornfield. The digital camera can be adapted for capturing a digital image of a section of the cornfield with the positioned digital camera. The average plane of the ears and an image plane of the digital camera can lie parallel to each other.

Additionally, the system can comprise a partial area determination unit for determining the area of the captured cornfield section from the defined distance and a viewing angle of the digital camera and an ear area determination unit that is adapted for determining the total area of the ears in the digital image. This can be carried out compared to the total area of the digital image by means of an algorithm for differentiating between image pixels of the ears and other image pixels that do not belong to the ears.

Furthermore, the system can have a yield determination module for determining the yield of the field from the total area of the ears in the digital image compared to the total area of the digital image, the determined area of the captured cornfield section, the average grain weight of an ear, a total field area and a calibration factor.

It should be noted that the system presented can be implemented as part of a smartphone. Moreover, by means of a high-performance form of a smartphone, the method presented here can also be completely or partially carried out by said smartphone. Alternatively, determining the total number of grains of an ear can also be carried out on a dedicated computer specially adapted for this purpose, a server computer or any other computer system.

For this purpose, it can be necessary for embodiments to be in the form of a corresponding computer program product. This product can comprise instructions which, when executed on a computer system, carry out steps of the method described.

The method presented for determining a weight of all of the grains of an ear of a grain stalk and the corresponding system have a series of advantages and technical effects:

Because of the simplicity of the means used for determining a yield—or for yield prediction—of a cornfield, it is possible to use the method anywhere without major expense. In cases where the digital images are first sent to a computer center for evaluation, this computer center can be located at virtually any desired location. The calculation can be offered as a service. On the other hand, if the evaluation is carried out directly in an application ("app") on a smartphone that also comprises the digital camera, there are no additional communication expenses, and the evaluation results are available virtually immediately. In addition to a smartphone, the digital camera, as well as the necessary evaluation logic, and optionally communication units for mobile data communication can be located in another device, or in a device designed specially for the purpose provided according to the invention.

The alternative possible positionings of the digital camera above the cornfield make it possible on the one hand to produce the digital image of an elevated location above the surface of the cornfield (e.g. from an agricultural machine); on the other hand, it is also possible to produce the required digital image while standing in the cornfield using the digital camera mounted on a rod.

In addition, the proposed method for yield prediction can be combined with a further elegant method for determining the grain weight of an ear. On the one hand, this makes it possible to estimate the yield of a cornfield directly from images of the ears of the cornfield. The same digital camera can be used in the method for yield analysis and in the partial method for determining the grain weight. Moreover, the calculations for yield prediction and the calculations for determining the grain weight can be carried out on the same computer system, allowing the results of the one calculation (grain weight) to be made available for the second calculation (yield prediction) as input values.

If a high-performance smartphone or another dedicated device having correspondingly high-performance electronics and a digital camera is available, the above-mentioned determinations (grain weight and yield prediction) can be carried out directly on this smartphone or the other dedicated device.

As mentioned above, for advance determination of the grain weight of an ear, the same digital camera—e.g. in a smartphone—can be used as a front end for the improved yield prediction. The use of a mobile device—such as a mobile telephone with a camera—is sufficient to allow farmers to make an improved yield prediction of their cornfield. For this purpose, it can be important as a point of departure to determine the yield potential of an ear of a cornfield. One or two digital images of an ear are sufficient to allow the farmer to make a significantly improved prediction of the yield of a field. The use of a further everyday item in the form of a reference card does not make the management or acceptance of the method more complex.

In this process, the ear can either be picked or cut off and placed on the reference card, or the ear can remain on the stalk and the reference card can simply be placed behind the ear. The scale on the reference card provides a clear and genuine measuring criterion together with the digital image.

The computing power required for automated measurement of the ear and the grain weight of the ear can be provided by a computer center. This computer center—just like the computer center for calculating the field yield—can be operated at any desired location. A computer can be used by a farmer, a plurality of farmers can operate the computer together, or a service provider can take over the analysis work and provide the required computing power. The latter possibility is further advantageous in that this service could be provided in the form of a cloud computing service for a large number of farmers in different regions or also in multiple countries. This would also make it easier to take into account parallels among different regions, global as well as local weather influences, or regionally known pest infestation, use of fertilizer, use of insecticides, etc.

The digital image can be transmitted via a mobile network to an evaluation computer. The analysis can be carried out, and the result can be wirelessly transmitted back to the farmer or the mobile device. By means of further methods, one could extrapolate from the grain weight of an ear to the entire field.

In a further improved form, and together with a high-performance computer system in the mobile device, the analysis could also be carried out directly on site. The required calculation algorithms could be made available in the form of a smartphone app. Alternatively, a dedicated calculating unit (a special processor or special hardware) can be attached to the mobile device or integrated into the mobile device.

Furthermore, it is not absolutely necessary—but is advantageous—to use a smartphone for the digital image. The farmer could also use a conventional digital camera and transmit the digital image of the ear in a different form to the computer for analysis, for example by means of wired communication technologies or relay stations that use known communication routes such as WLAN, Bluetooth or other comparable communication means.

Determination of the natural, non-constant spindle steps of the ear and multiplication of the determined number of spindle steps by an average factor of grains per spindle step allows elegant determination of the number of grains per ear. This provides a basis for estimating the field yield.

The template matching method used for determining the number of spindle steps provides, because of the type of digital images of the ear—in the form of the spindle or spindle step view and a potential second digital image that is rotated by 90° about the longitudinal axis (flower view)—a good basis for the further image processing and determination steps.

In the following, further embodiments of the suggested method for determining a weight of all of the grains of an ear of a grain stalk are described.

According to a embodiment of the method for determining a field yield, the algorithm used for differentiating between image pixels of the ears and other image pixels can be a local binary pattern algorithm. Such algorithms are generally known. An example is published in: DC. He and L. Wang, "*Texture Unit, Texture Spectrum, and Texture Analysis*", IEEE transactions on Geoscience and Remote Sensing, vol. 28, pp. 509-512, 1990; T. Mäenpää, M. Pietikäinen, and T. Ojala, "*Texture classification by multi-predicate local binary pattern operators*", Proceedings, 15th International Conference on Pattern Recognition, Barcelona, Spain, 3:951-954, 2000. This provides an effective calculation algorithm that is directly and easily usable for the proposed method in the form of existing program libraries.

According to a further advantageous embodiment of the method, the algorithm for differentiating between image pixels of the ears and other image pixels can be a method for texture image analysis. Such methods are also generally known, can be adapted according to the requirements of the method presented and are described for example in: F. Cointault, D. Guerin, J-P. Guillemin & B. Chopinet, "*In-field Triticum aestivum ear counting using colour-texture image analysis*", New Zealand Journal of Crop and Horticultural Science, vol. 36, pp. 117-130, 2008. This algorithm can also be easily adapted to the object position shown here.

According to an additional advantageous embodiment of the method, the algorithm for differentiating between image pixels of the ears and other image pixels can comprise or consist of a brightness difference filter. However, it should be taken into consideration that differences in recognition may by all means occur depending on illumination, time of day, color components of sky light, as well as rain, fog, and/or sunlight. For this reason, it can be advantageous to produce the ear or the field section in all cases using artificial lighting such as an artificial flash.

According to a further advantageous embodiment of the method, the defined distance between the digital camera and the surface of the cornfield can be determined by means of a spacer between the digital camera and an average plane of the ears of the cornfield. The spacer can be composed of a flexible element—such as e.g. a cord—one end of which is attached to the digital camera and the other end of which has a color contrast ball that is positioned in the average plane of the ears of the cornfield. Because of the color contrast between the color contrast ball and the environment (i.e. essentially the ears), the ball is clearly visible or recognizable in the digital image by means of pattern recognition. The color contrast ball can for example have a blue or bluish-green color value. In addition to a ball, other regular geometric shapes are also suitable, such as a pyramid, a barrel, a cube, a box-shaped element, or also irregular objects that show good color contrast relative to the color values of the ears.

According to an additional embodiment of the method, the defined distance can be determined by means of a spacer between the digital camera and an average plane of the ears of the cornfield. For this purpose, the digital camera can be attached at a predetermined angle that is not equal to 90° at one end of the spacer, and the other end of the spacer can be positioned on an average plane of the ears of the cornfield. The digital image can be captured when the image plane of the digital camera is horizontally aligned. For example, the digital camera can be automatically activated by acceleration or position sensors that can be attached to the camera. Here, it is assumed that the average plane of the ears of the cornfield runs horizontally.

According to the invention, after positioning of the digital camera and capturing a digital image of a cornfield section, the size of the surface area of the captured cornfield section is determined ("determining an area of the captured cornfield section from the defined distance and a viewing angle of the digital camera"). In a further step, the total area of the ears in the digital image is determined from the digital image ("determining a total area of the ears in the digital image compared to the total area of the digital image"). The result, for example, is that a specified percentage of the pixels of the image represent ears. In a further step, the number of ears in the digital image can be determined. For this purpose, one must know the average area (how many pixels) taken up by an individual ear. This value can be represented by the first calibration factor, which is ordinarily empirically determined. If one divides the total area of the image attributable to ears by the average size of the area taken up by a single ear, one obtains the number of ears in the image. If one divides the number of ears in the image by the size of the area of the cornfield in the image section, one obtains the number of ears per unit area of the cornfield. If one multiplies the number of ears per unit area of the cornfield by the total area of the field, this gives the number of ears in the entire field. If one multiplies the number of ears in the entire field by the average grain weight of an ear, this gives the grain weight of the entire field—and thus the yield ("determining a yield of the field from the total area of the ears in the digital image compared to the total area of the digital image, the determined area of the captured cornfield section, the average grain weight of an ear, a total field area and a first calibration factor"). In a preferred embodiment of the method, the first calibration factor can have at least one dependency with respect to one of the factors type, growth stage—more particularly represented in the form of the BBCH code-weather, geographic location and/or fertilization status. Further dependencies are conceivable. The geographic location can for example be determined by GPS (global positioning system) coordinates. The calibration factor itself can be a direct function of the input variables. Dedicated input values can be stored together with result values in a matrix and be accessed there by means of the method.

According to a preferred embodiment of the method, determining the total area of the ears in the digital image compared to the total area of the digital image can further comprise application to the areas of the ears of an area factor, the value of which decreases from the center of the digital image to its edge. This is advantageous because the ears in the center of the image can be better recorded centrally from above, while ears in the edge areas of the digital image—because of the different viewing angle—can be better recorded from the side and therefore take up a larger section of the image. This effect can be compensated for using the area factor.

According to a useful embodiment of the method, the method can comprise providing a second digital image of an individual ear in a spindle step view of the ear. The ear in the digital image can be depicted in front of a reference card as a background.

The method according to this embodiment can further comprise determining the length of the ear along the longitudinal axis of the ear by separating image pixels of the digital image of the ear from the background and comparing pixel coordinates at one end of the ear with pixel coordinates of the ear at an opposite end of the ear in a longitudinal direction of the ear by means of image marks on the reference card.

Moreover, the method according to this embodiment can comprise determining a number of spindle steps of the ear by means of a template matching method, determining a number of grains of the ear by multiplying the determined number of spindle steps by a factor, and determining the weight of all of the grains of the ear by multiplying the determined number of grains by a second calibration factor.

In this way, the grain weight of an ear can be elegantly determined without requiring weighing out. The optical method allows elegant and direct determination of the grain weight, either on a smartphone or at a separate computer center to which the recorded digital image has been transmitted in the spindle step view. This allows the same technical device—namely the smartphone—to be used both for determining the grain weight and for determining the field yield.

According to an advantageous embodiment of the method, the template matching method can comprise pixel-wise displacement of a selected image template composed of an average partial area of the ear over the entire ear in a longitudinal direction of the ear. Additionally, the method can comprise respective determination of a respective similarity factor of the image template with a respective covered ear section in each displacement position. This allows regular relative maxima to occur with respect to the similarity factor of an x-y representation. In the representation, the x direction of the representation can be the pixel number or position, and in the y direction, one can plot a similarity value of the respective ear section with the template.

The selected partial area of the ear can take up approx. 15-25% of the ear in an average area of the ear. Additionally, this embodiment can comprise determining the number of spindles from the x-y representation. As the template matching method is a known method from the field of image processing, conventional program library functions and modules can be used. Use of this matching method provides favorable accuracy and robustness against fluctuations in illumination geometry during determination of the spindle steps. This is advantageous because the number of spindle steps has a decisive effect on the number of grains of the ear. An additional spindle step of the ear can be synonymous with 4 additional grains, which can increase the total number of grains of the ear by up to 10%. Accordingly, the most accurate detection possible of the number of spindle steps can be synonymous with the accuracy of the suggested method.

According to an additional special embodiment, determining the number of spindles from the x-y representation in the method can comprise determining the number of relative maxima of a similarity value by means of simple counting. This procedure requires little computing power, but is not the most accurate compared to other methods, because the degree of similarity decreases toward the ends of the ear and the maxima are therefore not as pronounced as in the central ear area.

According to a further embodiment, determining the number of spindles from the x-y representation in the method can comprise determining an average period length from the distances of the relative maxima of a similarity value from one another and determining the number of spindles by dividing the ear length by the period length.

In contrast to the above-described embodiment, the current described embodiment can show a higher degree of accuracy in determining the number of spindle steps. The reason is that the relative maxima in the x-y representation can be more sharply pronounced than in the previous embodiment. This results in higher accuracy in determining the number of spindle steps of an ear.

In further advantageous examples, the second calibration factor can comprise at least one dependency with respect to one of the following factors: type of ear, growth stage of ear, weather (long-term and short-term), geographic location and fertilization status. Further influencing parameters can be taken into consideration at any time.

According to an alternative method for determining the grain weight of an ear, the method for predicting the yield of a cornfield can comprise a partial method, more particularly a grain weight determination method, for determining a weight of all of the grains of an ear of a grain stalk. This partial method would be an alternative to the partial method in which a spindle step view of the ear is used. This grain weight determination method can comprise providing a digital image of the ear in a flower view of the ear in front of a reference card and determining an area of the flower view of the ear by separating image pixels of the digital image of the ear from the background by means of a color histogram process. Furthermore, this grain weight determination method can comprise comparing an area taken up by the ear with image marks on the reference card. Additionally, the partial method for determining grain weight of the method for yield prediction can comprise determining the weight of all of the grains of the ear by multiplying the determined area of the ear by a calibration factor. This calibration factor can show different dependencies, such as dependency on the type of corn, the growth stage, the weather, a fertilization status, a known pest infestation, etc.

This partial method has the advantage of being easy to use. The computation intensity can be lower than in the partial method for determining the grain weight that uses the spindle step view of the ear. This makes this partial method easier to implement directly in a mobile device in the field.

Alternatively, it would also be possible to transmit the captured digital images to an assessment computing center and then receive the result with the mobile device in the field. This partial method has the further advantage that the digital image of the flower view is easier to prepare than the spindle step view, as the ear comes to rest in a natural position in a flower view. This would make it easer for the person taking the digital image. It has been found that by means of the grain weight determination method presented here, relatively good assessments of the grain weight of an ear can be made.

According to an advantageous embodiment, the system for yield analysis of the cornfield comprises a sending and receiving unit that is adapted for transmitting the captured digital image of the cornfield section—or also the second digital image—to a computer center that comprises the partial area determination unit, the ear area determination unit and the yield determination module. After calculation is carried out by the determination units and the module, the result can be sent back to the smartphone, the digital camera or the other mobile device and further utilized directly in the field.

Moreover, embodiments can take the form of an assigned computer program product that can be accessed from a computer-usable or computer-readable medium. The instructions can cause a computer-such as e.g. a smartphone, a server or a combination of the two—to execute processing steps according to the method presented. For the purpose of this description, the computer-usable or computer-readable medium can be any apparatus comprising elements for storage, communication, transport or transmission of the program together with the instruction-processing system.

The invention is described in further detail below using examples and figures. It should be noted that aspects of the invention are described in the context of various types of examples. Some examples are described with respect to process claims, while other examples are described in the context of device-type claims. Nevertheless, the person having ordinary skill in the art will be able to understand from the above and following descriptions—unless a deviation therefrom has been indicated—that not only can features of a claim genre be combined with one another, they can also constitute a combination of features that exceeds the scope of the claim type.

The aspects and further aspects of the present invention presented above are derived from the examples and figures, which are described in further detail below.

These examples serve as possible implementation forms, without being limited thereto, and they refer to the following figures:

FIG. 1 shows a block diagram of an embodiment of the method according to the invention for determining the yield prediction of a cornfield.

FIG. 6 shows a block diagram of the partial method for determining the grain weight of an ear.

Figure 2:
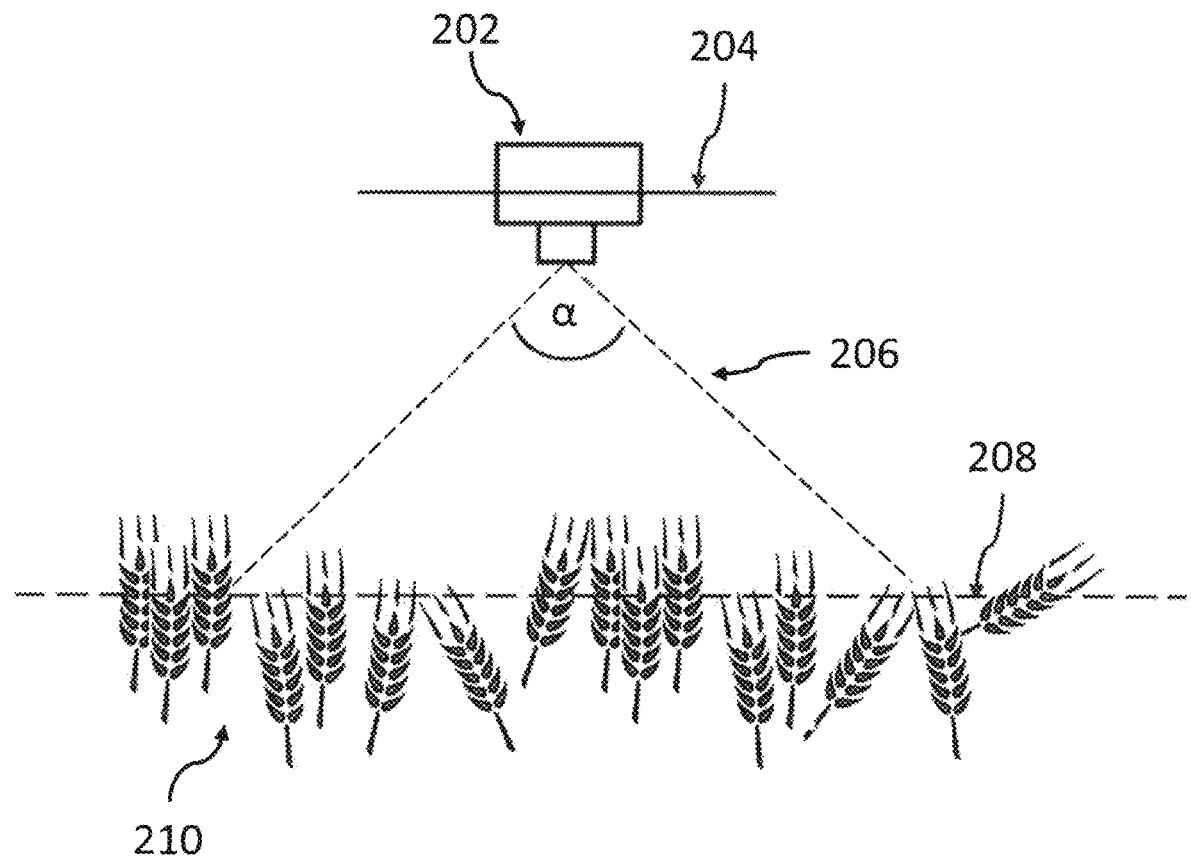
FIG. 2 shows positioning of a digital recording device above ears of a cornfield.

In the context of this description, the following conventions, terms and/or expressions may be used:

The term "grain stalk" or "ear of a grain stalk" requires no further interpretation. This can be an ordinary cereal plant that grows in an agricultural field. Typically, the grain can be wheat, rye or barley.

The term "digital image" describes a digital representation of an actual scene that can typically be taken by means of a digital camera. The digital image or the digital picture can be composed of pixels having differing color values and thus produce a graphical overall impression. In the method presented here, a digital image of the surface of the cornfield from a bird's eye view and optionally a further digital image of an individual ear for determining the grain weight of a typical ear are taken.

The term "flower view of the ear" describes a view of the ear in which the grains are clearly visible. The flower view can also be referred to as a grain view of the ear, because the grains of the ear are the most clearly visible in this view. In this view, the awns predominantly extend to the left and right respectively away from the ear. In this view, the view area of the ear is the largest. In contrast to the flower view, the term "spindle step view" describes a view of the ear rotated by 90° along the longitudinal axis of the ear, i.e. a view of the narrow portion of the ear. In this case, one is therefore looking at the narrower side of the ear or at the awns of the ear if the longitudinal axis of the ear runs vertically.

In the context of this description, a "reference card" is a flat object—for example a card having a single color—the color value of which differs sharply from that of the car. A color that is complementary to a typical color value of the ear—e.g. blue—has been found to be advantageous.

The term "template matching method" is known to the person having ordinary skill in the art as a method for determining the structure of a digitally represented object. A more detailed description can be found for example in S. Kim, J. McNames, "*Automatic spike detection based on adaptive template matching for extracellular neural recordings*", Journal of Neuroscience Methods 165, pp. 165-174, 2007.

The term "development stage" describes a stage in the natural life cycle of a plant—here a grain ear—from sowing until harvest. It has been found that using the "BBCH Code" for describing the development stage of a plant is helpful. The abbreviation "BBCH" officially stands for "Biologische Bundesanstah, Bundessortenamt and Chemische Industrie [Federal Biological Research Centre, Federal Plant Variety Office, and Chemical Industry]." The BBCH code describes a phenological development stage of plants. The code begins with 00 and ends with 89. For example, a BBCH code of between 10 and 19 describes an early development stage of a leaf. Beginning with a BBCH code of 60, the flower of the plant appears (up to 69). The next 10 steps respectively describe the fruit development (70-79), ripening of the seed (80-89) and death (90-99—for annual plants) of the plant.

The term "digital camera" describes a camera that uses a digital storage medium as a recording medium instead of a photographic film. The digital image is first digitized by means of an electronic image converter (image sensor).

The term "color contrast ball" describes an object that comprises a spatial extension that is of the same magnitude as the average length of the ears (e.g. a few centimeters in size) and has a weight of the magnitude of approx. 10 to 100 g. Its color is ideally complementary to a dominant color of a surface of a cornfield. Advantageously, this is a complementary color of a cornfield in a ripe state. For example, the color contrast ball can have a blue color value on its surface. It is not actually necessary for the object to be spherical. Other geometric shapes are also possible. What is important is that the color contrast ball be easily distinguishable from pixels of the cornfield by means of optical recognition methods.

The term "texture image analysis" describes a method in which the texture of an object of a digital image is analyzed. In this context, texture is understood to refer to the superficial appearance of the object or its environment. Examples of methods for texture image analysis are described for example in: F. Cointault, D. Guerin, J-P. Guillemin & B. Chopinet, "*In-field Triticum aestivum ear counting using colour-texture image analysis*", New Zealand Journal of Crop and Horticultural Science, vol. 36, pp. 117-130, 2008.

FIG. 1 shows a block diagram of an example of the method according to the invention 100 for predicting the yield of a cornfield. The method comprises positioning 102 of a digital camera at a defined distance above an average plane of ears of a cornfield—i.e. from a bird's eye view—and capturing 104 of a digital image of a section of the cornfield with the positioned digital camera. The average plane of the ears and an image plane of the digital camera should lie parallel to each other. This can be carried out automatically using acceleration or position sensors of the camera. Automatic activation of the camera can be carried out precisely when the image plane is horizontally aligned.

Furthermore, the method comprises determination 106 of an area of the captured cornfield section from the defined distance and a viewing angle of the digital camera and determination 108 of a total area of the ears in the digital image compared to the total area of the digital image by means of an algorithm for differentiating between image pixels of the ears and other image pixels that do not belong to the ears. Based on this, the method comprises determination 110 of a yield of the field from the total area of the ears in the digital image compared to the total area of the digital image, the determined area of the captured cornfield section, the average grain weight of an ear, a total field area and a first calibration factor. This first calibration factor can depend on type, growth, weather, geographic location and/or fertilization status. Further dependencies with respect to a pest infestation are also possible. For example, the area of the captured cornfield section could be 4 m$^2$. It could be determined from the analysis of the digital image that 20% of the pixels are attributable to ears. Accordingly, for an image size of 1920×1080 pixels, 41,472 pixels would be attributable to cars. Based on empirical tests, it could be determined that an ear under the conditions in question typically accounts for an average size of 208 pixels. In this case, approximately 200 ears would be depicted on the digital image. For a cornfield section of 4 m$^2$, this would correspond to approximately 50 ears per m$^2$ of field area. If the total area of the field were 1 km$^2$, there would be 50 million ears in the entire field. If the average grain weight were 3 g per ear, the total grain weight in the field would be 150 tons.

FIG. 2 shows positioning of a digital recording device 202 above ears 210 of a cornfield. For example, the digital recording device can be an individual digital camera or a digital camera in a mobile telephone—e.g. a smartphone. The camera 202 captures a defined section of the surface of the cornfield. The section is essentially determined by the distance of the image plane 204 of the camera 202 and the viewing angle α 206 of the camera 202. In recording of the digital image, the image plane 204 of the camera 202 is advantageously parallel to an average horizontally running plane 208 through the ears 210 of the cornfield.

Figure 3:
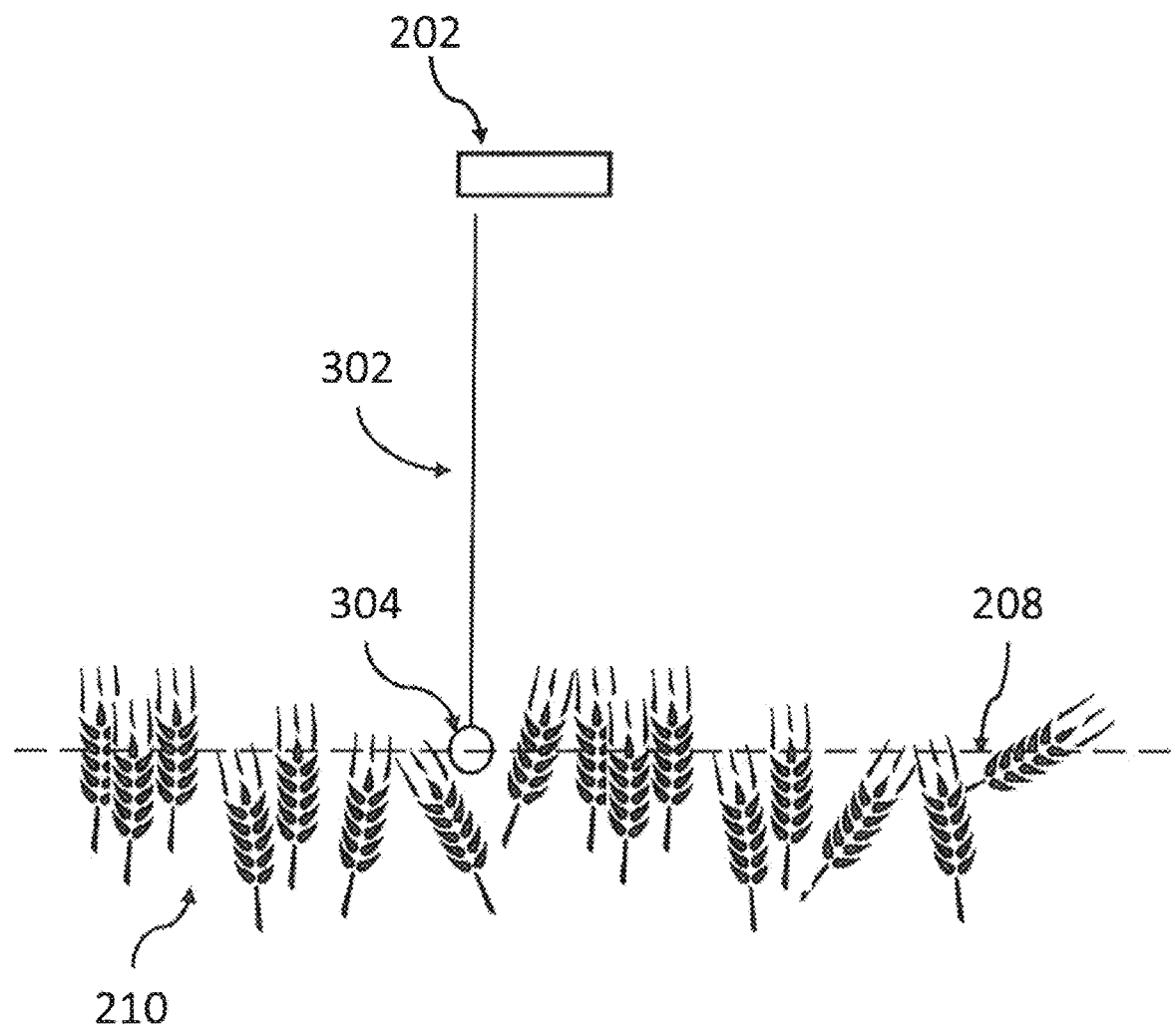
FIG. 3 shows a means for preferred positioning of the camera above the average plane of the ears of the cornfield.

FIG. 3 shows a means for preferred positioning of the camera 202 above the average plane 208 of the ears 210 of the cornfield. The means can be a spacer 302 between the camera 202 and a weight 304. The spacer 302 is attached both to the camera 202 and the weight 304. The weight 304 can for example consist of a ball. The color of the ball 304 should be clearly distinguishable from the color of the ears 210 or the cornfield. A blue color of the ball 304 is suitable as a complementary color to the color of ripe or almost ripe corn (color contrast ball). The spacer 302 can be configured in the form of cords or a cord-like structure. This ensures that because of gravity, the spacer 302 will always be perpendicular to the average plane 208 of the ears 210 of the cornfield. It is also ensured in this manner that the size of the section of the cornfield can be easily calculated based on the length of the spacer 302—in the position just described—and the viewing angle of the camera 202. In the case of a square digital image, the side length a of the digital image would be calculated from a=2*L*tan (α/2). Here, L is essentially the length of the spacer 302 and α the viewing angle of the camera 202.

Figure 4:
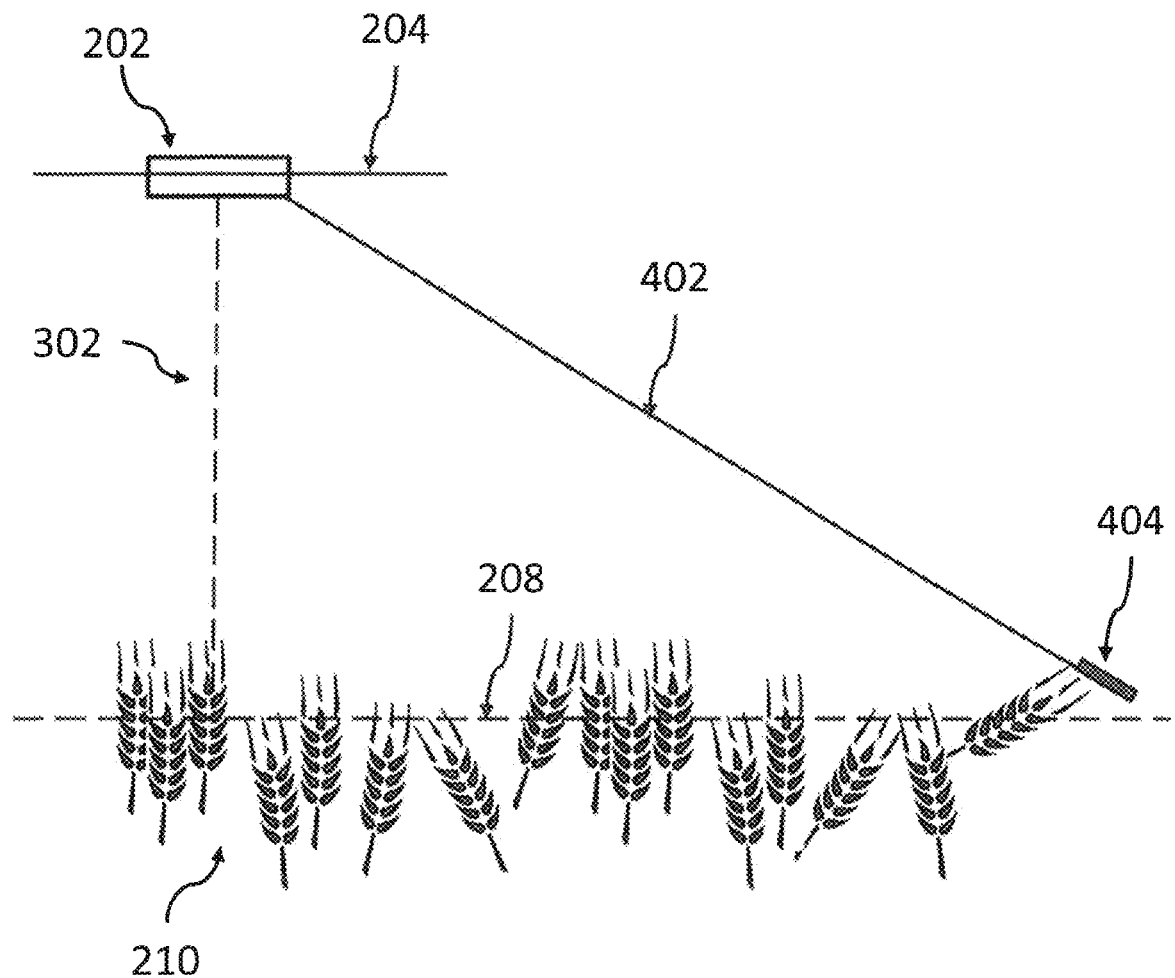
FIG. 4 shows an alternative for reproducible distance positioning of the camera from the average plane of the ears of the cornfield.

FIG. 4 shows an alternative for reproducible distance positioning of the camera 202 from the average plane 208 of the ears 210 of the cornfield. The camera is mounted at the end of a rod 402 at a defined angle. This angle is ideally greater than half of the viewing angle of the camera 202. If the end 404 of the rod 402 is located at the height of the average plane 208 of the ears 210 of the cornfield, the distance 302—which is now not defined by a spacer 302—is calculated from L=Lrod*sin (90−δ), where δ is the angle between the rod 402 and the image plane 204 of the camera. Based on this known distance of the camera 202 from the average plane 208 of the ears 210 of the cornfield and the viewing angle of the camera 202, one can calculate—as shown above—the area corresponding to the digital image of the camera 202.

Recording of the digital image can be initiated in different ways. On the one hand, it is possible to integrate an actuator into the handle 404 of the rod 402. In this variant, however, it could be difficult to orient the image plane 204 of the camera 202 so that it is parallel to the average plane 208 of the ears 210. In a more elegant solution, recording would be automatically initiated as soon as the image plane 204 is horizontal after a signal 204 is initiated indicating that the camera 202 is ready for recording. In this way, it could be ensured that the image plane 204 and the average plane 208 of the ears 210 are parallel. An assessment concerning the horizontal orientation of the image plane 204 can be detected by means of acceleration sensors (or other sensors) of the camera.

Figure 5:
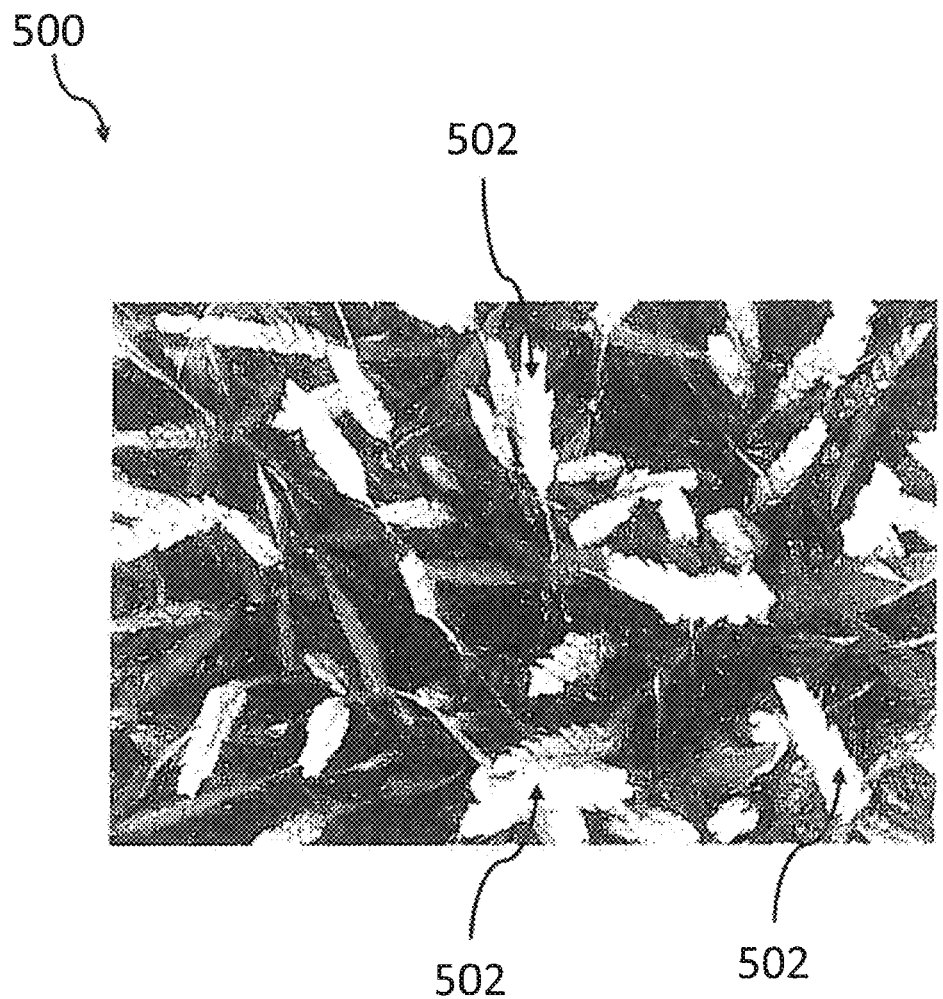
FIG. 5 shows an example of an image of the cornfield corresponding to a method that was presented in the context of FIG. 4 and FIG. 5.

FIG. 5 shows an example of an image 500 of a cornfield section. By means of the methods described above in the context of FIGS. 2 to 4 or comparable methods, the size of the area of the cornfield corresponding to the digital image can be determined. The ears 502 can be clearly seen in the example image 500. It can also be seen that the ears 502 located in the middle of image are recorded at an angle different from that of the ears 502 located in the outer areas of the image 500. This arises from simple optical considerations. This effect can be compensated for by means of an area factor that decreases in the direction of the edges of the digital image 500. Moreover, it can be seen in FIG. 5 that individual ears overlap. Accordingly, the number of ears present in the image cannot be determined for example by determining the number of coherent areas of similar brightness values or similar textures. According to the invention, therefore, the total area of the ears in the digital image is first determined compared to the total area of the digital image, and in a further step, the number of ears present is determined based on a typical size of an ear in a digital image. The information on the typical size of an ear in a digital image is provided by the first calibration factor, which is ordinarily empirically determined.

By determining the area taken up by ears 502 in the image 500, one can extrapolate to find the yield of the entire field.

Advantageously, the grain weight of an ear 502 is taken into account in projecting the field yield. It is explained in the following figures how such a grain weight can also be determined by means of an additional digital image of an individual ear.

FIG. 6 shows a block diagram of an example of the expanded method 600 for determining the total number of grains of an ear of a grain stalk. The method first comprises the provision 602 of a digital image of the ear in a spindle step view of the ear. The ear, in capturing of the digital image, should be located in front of a reference card as a background. For practical reasons, the reference card is preferably a color that is complementary (e.g. blue) to a the typical color of an ear of corn (yellowish).

As a further step, the method comprises determination 604 of a length of the ear along the longitudinal axis of the ear by separating image pixels of the digital image of the ear from the background. This separation can be advantageously carried out by means of a color histogram process. In this way, a coherent surface of the ear can be distinguished from the background of the reference card. Additionally, the method comprises in this step comparison 606 of pixel coordinates at one end of the ear with pixel coordinates of the ear at an opposite end of the ear in a longitudinal direction of the ear by means of image marks on the reference card. In this manner, by means of a scale located on the reference card, the length of the ear can easily be determined. For this purpose, it is necessary only to subtract the corresponding y coordinates from each other.

It is advantageous if the image of the ear is subjected prior to determination of its length to a transformation that compensates for perspective distortions and oblique positions.

After this, determination 608 in the method of a number of spindle steps of the ear by means of a template matching method can be carried out, followed by determining a number of grains of the ear (step 610) by multiplying the determined number of spindle steps by a factor that indicates the number of grains per spindle step and for example has a value of 4.

In a final step of the method, determination 612 is carried out of the weight of all of the grains of the ear by multiplying the determined number of grains by a calibration factor. The calibration factor can take into account numerous variable influencing parameters. By continuously comparing the grain weights determined by the method with the grain weights determined by weighing out, a continuous and machine-supported learning process can be implemented within the method.

Figure 7:
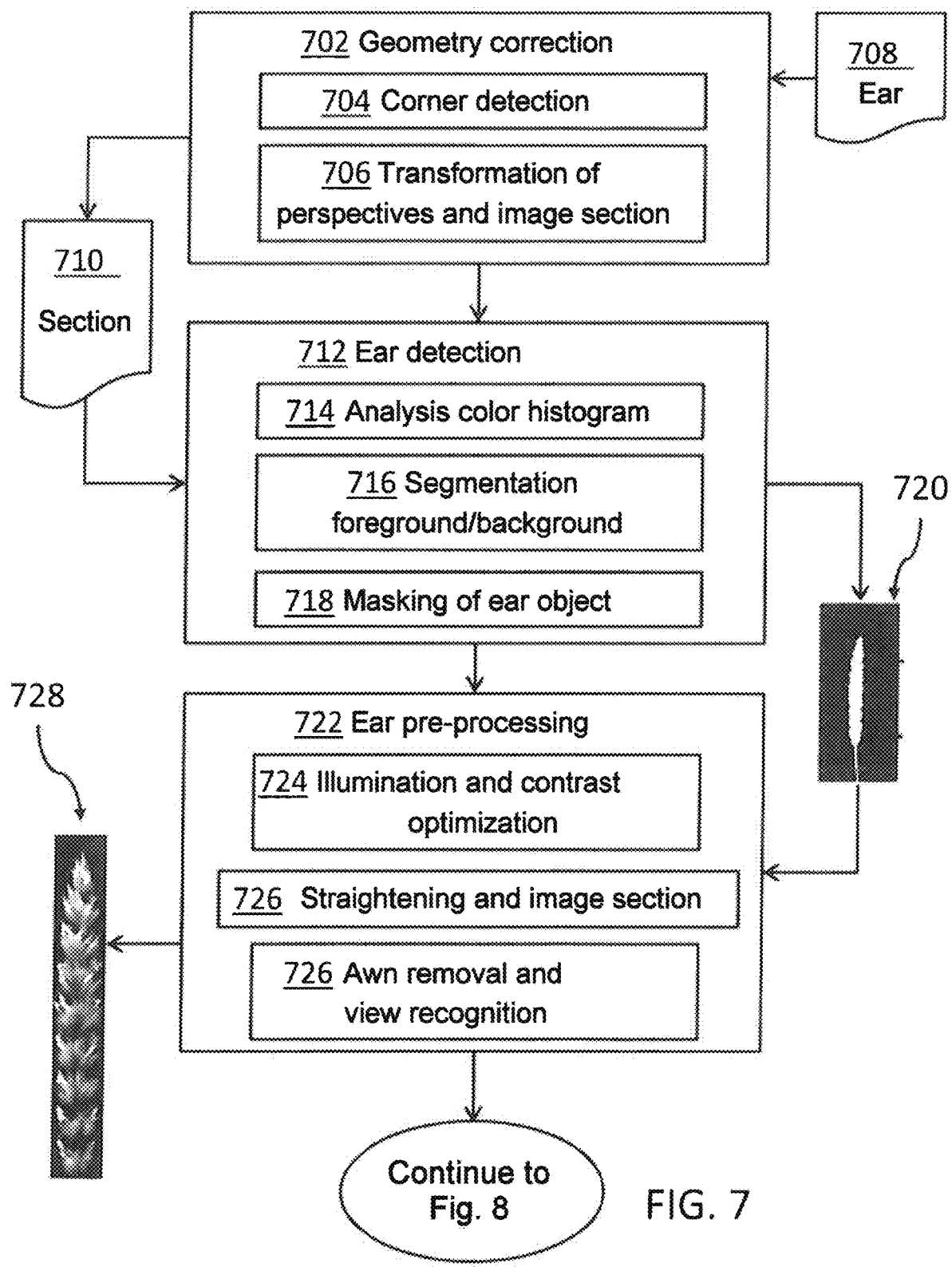
FIG. 7 shows a first part of a block diagram of an embodiment of the suggested method that is closer to implementation.

FIG. 7 shows a first part of a block diagram of an embodiment of the suggested method that is closer to implementation. A digital image 708 of an ear is first received together with a reference card. A geometry correction 702 also includes a corner detection 704 of the corners of a colored area on the reference card. After this, transformation 706 of the perspectives and image section 710 is carried out so that areas outside the colored background with the ear lying thereon are ignored.

The image section 710 obtained in this manner is passed on by an ear detection function 712. The actual ear detection takes place by means of analysis 714 by a color histogram process in order to differentiate pixels of the ear and the colored background from one another (716 foreground/background segmentation). After this, the recognized ear object is masked, 718. In this masked representation, recognized image pixels of the background can be represented as a logical "0."

In a subsequent processing block, ear preprocessing 722 is carried out. This can comprise a step of illumination and contrast optimization 724. Next, transformational straightening 726 of the ear and further reduction of the image section to be processed can be carried out. Optional awn removal makes it possible to recognize the view of the ear (step 726). Ideally, the view of the ear is a spindle step view. The further processing of the digital image received is carried out based on FIG. 8.

Figure 8:
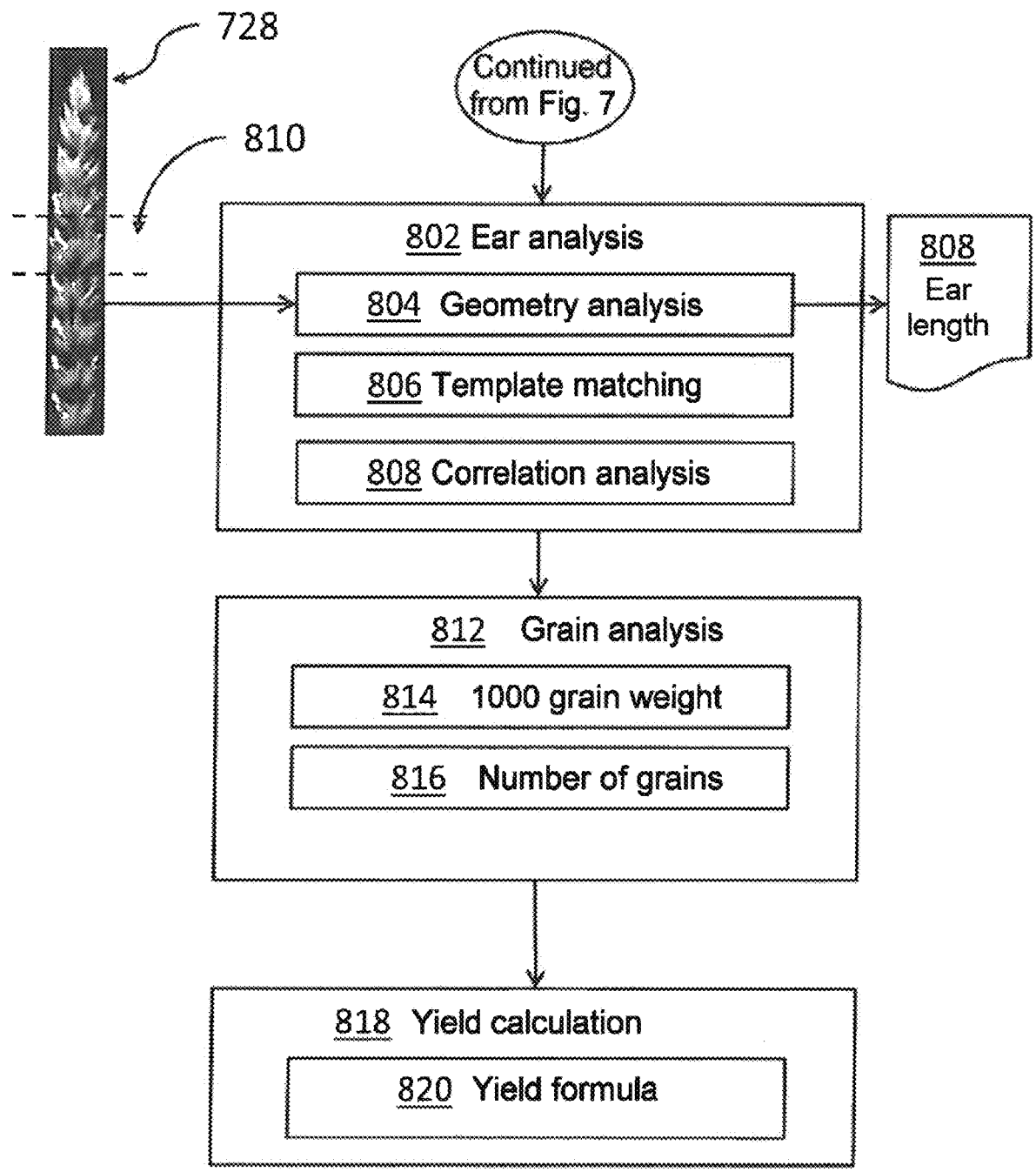
FIG. 8 shows a second part of the block diagram of the embodiment of the suggested method that is closer to implementation of FIG. 7.

FIG. 8 shows a second part of a block diagram of an embodiment of the suggested method that is closer to implementation. The actual ear analysis 802 takes place here. For this purpose, a geometry analysis 804 is first required, the result of which is determination of the ear length 808. A comparison of the uppermost pixels of the ear with the depicted and recognized scale or the known size of the colored area of the reference card—optionally with the aid of corner marks—allows, in connection with the distance to the stalk base at the lower end of the stalk base at the lower end of the ear, determination of the length of the ear in the longitudinal direction, as shown in FIG. 9.

Figure 10:
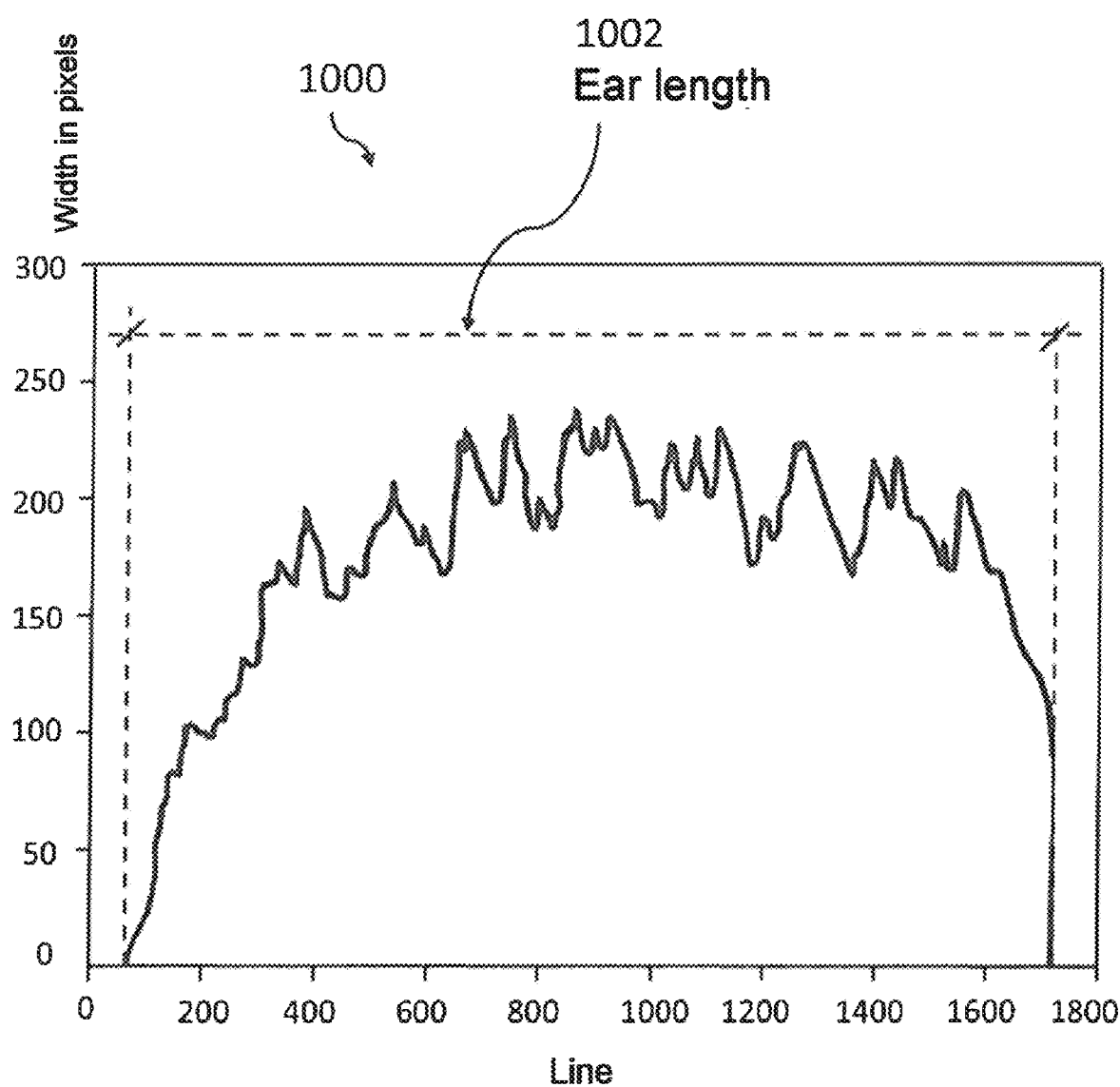
FIG. 10 shows an illustrative diagram for determining the ear length.

In the subsequent template matching method 806, a middle selected area 810 of the ear 728, in the form displayed at this time, is displaced pixelwise in a vertical direction along the vertical longitudinal axis of the ear 728 above the ear. A respective similarity factor is determined that is mathematically determined by the cross correlation function 810 between the template and image function. Because of the periodic pattern of the ear structure, pronounced maxima values arise in the course of the cross correlation function 810 that lie at a periodic distance from one another. A result of such a correlation analysis 808 is shown in FIG. 10, which yields the period length and thus the distance of the spindle steps from one another. The ratio of ear length 808 to period length provides a highly accurate measurement of half of the number of spindle steps, because the periodicity of the spindle steps is extremely clear and pronounced, with unvarying distance.

After this, on the basis established in this manner, the grain analysis 812 is carried out, with determination of the number of grains 816 and the 1000-grain weight 814. Additionally, this can be followed by yield calculation 818 for the entire field, or a partial area thereof, by means of a yield formula 820. The 1000 grain weight—also referred to as thousand grain weight (TGW)—is a common calculation value for estimating yields in an agricultural environment and indicates the weight of 1000 grains of a grain batch. It can be calculated from the grain weight of an ear and the determined number of grains of the ear.

Figure 9:
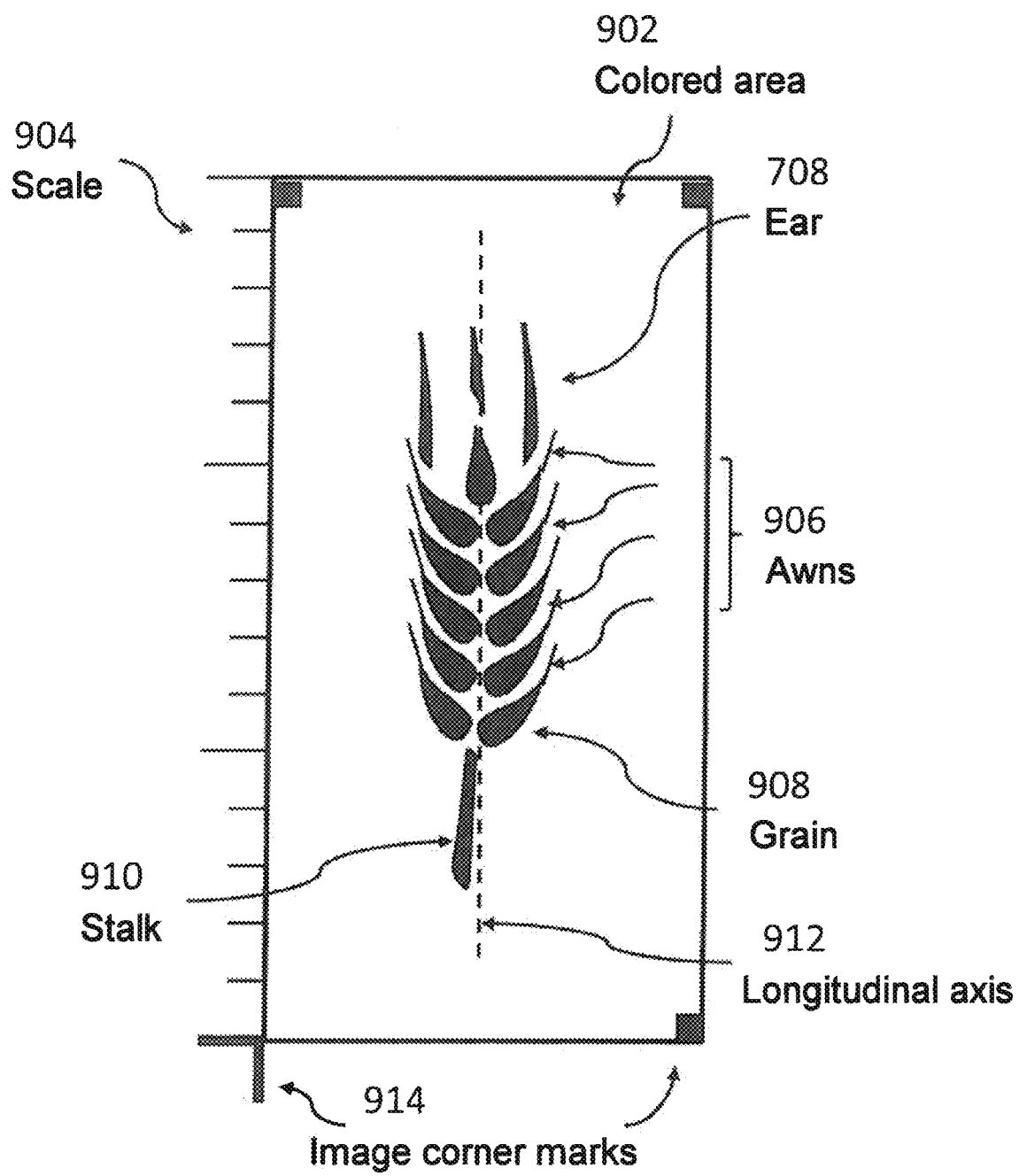
FIG. 9 shows an abstract representation of an ear and an example of a reference card together with an ear lying thereon.

FIG. 9 shows an abstract representation of an ear 708 and an example of a colored area 902 (not visible in black and white representation) of a reference card (that can be larger than the area 902) together with the ear 708 lying thereon. The colored area 902 comprises image marks such as a scale 904, and for example image corner marks 914. The image corner marks 914 can have various characteristics.

As extensions of the grain 908, awns 906 are symbolically shown that can be of varying length depending of the type of grain. Moreover, another piece of the stalk 910 is shown, which is important in the method presented only for recognition of the lower ear field.

The ear 708 should be oriented on the colored area 902 of the reference card in such a way that the longitudinal axis 912 of the ear 708 is oriented as close to parallel as possible to a side line of the colored area 902. A typical curved form of the ear 708 can be adapted by transformation of the representation of the ear 708 such that the longitudinal axis of the ear is actually oriented parallel to a side line of the colored area 902 of the reference card. The reference card is typically slightly larger than the colored area 902 contained thereon, the color of which is e.g. blue.

Of course, an actual image of an ear 708 represents a coherent area (for example as shown in FIG. 7, 720, 728). The type of representation of an ear 708 used here is to be understood merely as a representation of the orientation of the ear 708 with respect to the reference card.

Figure 9A:
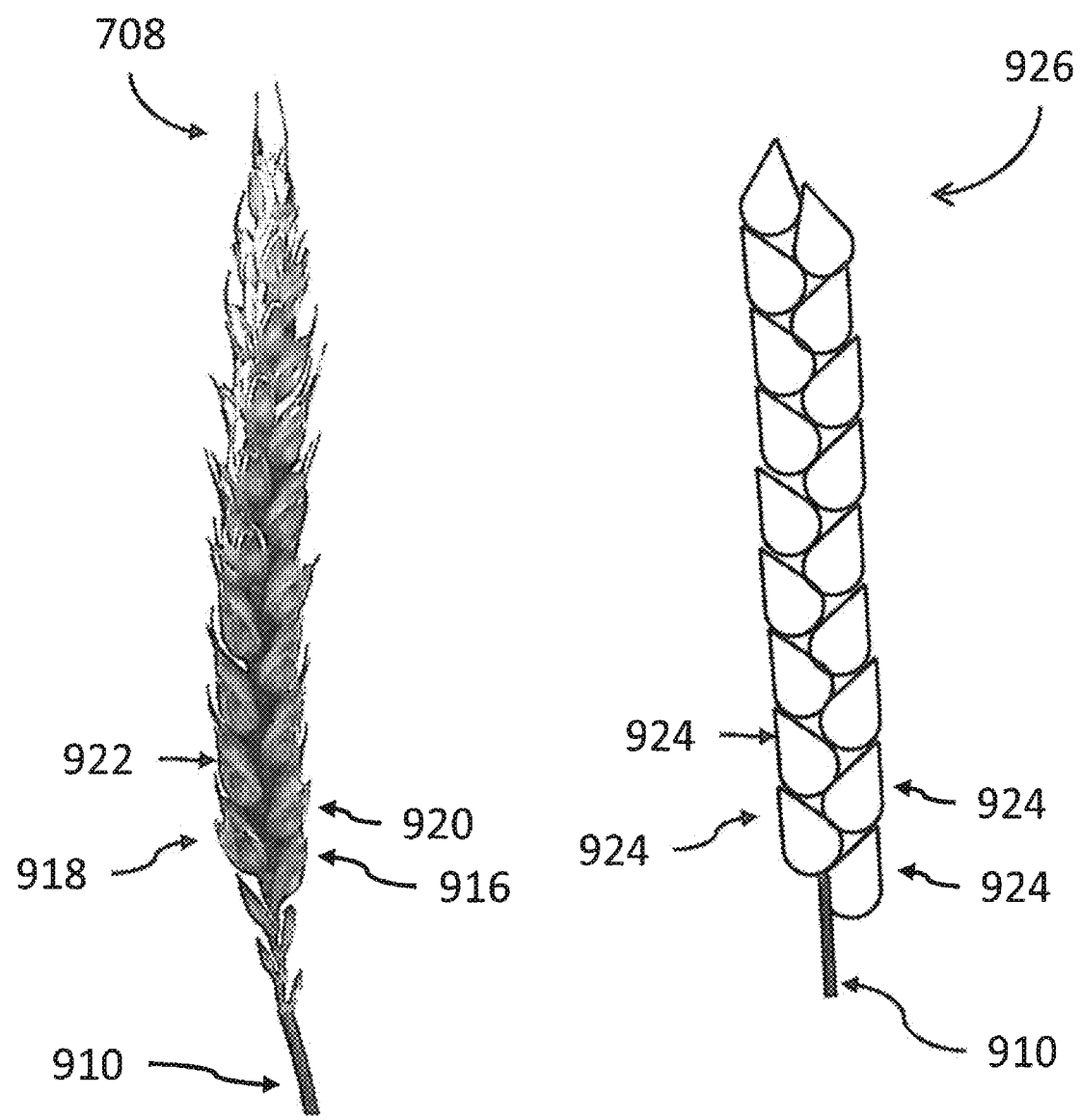
FIG. 9a shows a diagram of an ear and a view of the spindle steps of an ear.

FIG. 9a shows a diagram of an ear 708 and a view 926 of the spindle steps of an ear. The image of the ear 708 clearly shows the different grains 916, 918, 920, 922 in the lower area of the ear and the stalk 910. Accordingly, the different spindle steps 424 of the ear 708 can be recognized in the more abstract form of the ear on the right side of FIG. 9a.

FIG. 10 shows an illustrative diagram 1000 for determining the ear length. Here, it can be seen that the width of the ear (y axis) is plotted per line of pixels (x axis) pertaining to the ear. Each of the individual relative maxima—or a group of relative maxima lying close together—pertains to a respective spindle step. The number of spindle steps can be recognized simply by counting the relative maxima or the groups of relative maxima. The ear length 1002 is determined from the beginning of the pixels of the ear at approx. line 60 and the end of the pixels of the ear at approx. line 1710 by means of the scale of the reference card or by knowing the width of an individual pixel or line of pixels.

Figure 11:
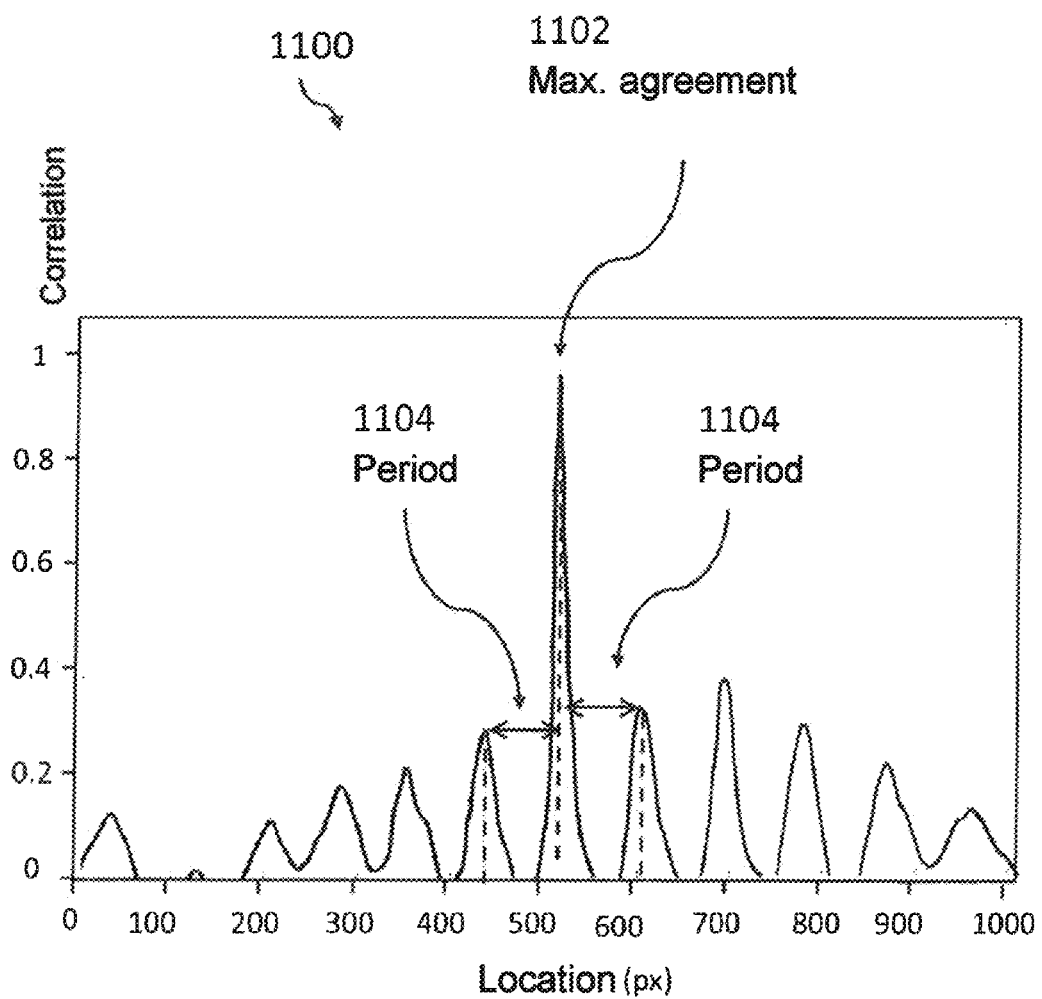
FIG. 11 shows an illustrative diagram of a cross correlation function for determining the number of spindle steps.

FIG. 11 shows an illustrative diagram 1100 of a cross correlation function for determining the number of spindle steps based on the template matching method. The x axis shows the respective position of the template (pattern from the middle of the ear) relative to a correlation value (similarity value) of the template relative to the entire ear. One can recognize in the center of the diagram—at the pixel value of about 525, cf. 1102/max. agreement—a correlation value of practically 1. At this location, the template is exactly at its original location. Based on the distances of the relative maxima of the representation, a period length 1104 can be determined that corresponds to the distance of the individual spindle steps from one another. Based on the determined length of the ear and the average determined period length 1104, the number of spindle steps can also be calculated by division and rounding off.

Moreover, an alternative form of the method 600 (i.e. as a replacement for or supplement to the partial method according to FIGS. 6 to 11) for determining the total number of grains of an ear of a grain stalk should be pointed out here: according to this embodiment as well, the process begins with preparation of a digital image of the ear. In this case, an image of the ear in the flower view—i.e. the view in which the grains of the ear are clearly visible—is captured in front of a reference card. This is followed by determining an area of the flower view of the ear by separating image pixels of the digital image of the ear from the background, e.g. by means of a color histogram process, and comparing the area taken up by the ear by means of image marks on the reference card. The image marks can be the scale of the reference card or constitute the known distances of other image marks on the reference card. After this, the weight of all of the grains of the ear is determined by multiplying the determined area of the ear by a calibration factor. It has been found that there is a pronounced direct correlation between the projection area of the ear in flower view and the number of grains of the ear. This phenomenon is used here in order to simply and elegantly determine the grain weight of the ear. This alternative method can also be used quite favorably beginning with a growth stage that is greater than 60 BBHC. However, it also works at lower BBHC values.

Figure 12:
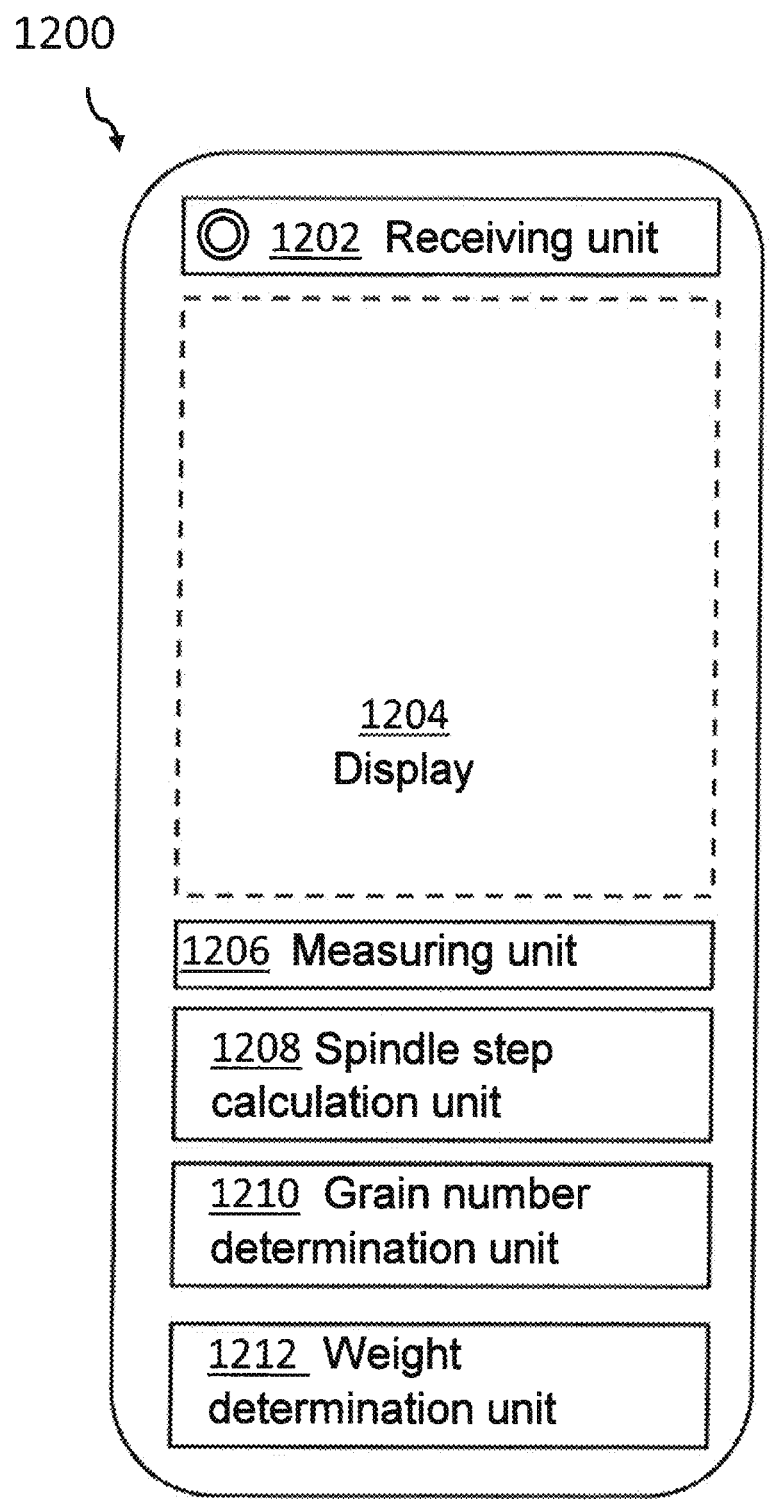
FIG. 12 shows a block diagram of a partial system for determining the total number of grains of an ear of a grain stalk.

FIG. 12 shows a block diagram of a system for determining the total number of grains of an ear of a grain stalk. The system comprises a receiving unit 1202 for receiving a digital image of the ear in a side view of the ear. If the system for determining the total number of grains is integrated into a mobile device, the receiving unit is then a digital camera. In another embodiment, a digital image of the ear is captured by a digital camera and transmitted to the receiving unit 1202—optionally wirelessly. The ear in the digital image is recorded in front of a reference card as a background. Optionally, the system can comprise a display unit 1204. Moreover, the system has a measuring unit 1206. It is adapted for determining a length of the ear along the longitudinal axis of the ear by separating image pixels of the digital image of the ear from the background. In addition, the measuring unit 806 is adapted for comparing pixel coordinates at one end of the ear with pixel coordinates of the ear at an opposite end of the ear in a longitudinal direction of the ear by means of image marks on the reference card.

Additionally, the system comprises a spindle step calculation unit 1208 that is adapted for determining a number of spindle steps of the ear by means of a template matching method, and a grain number determination unit 1210 that is adapted for determining a number of grains of the ear by multiplying the determined number of spindle steps by a factor.

Finally, a weight determination unit 1212 is also provided in the system that is adapted for determining the weight of all of the grains of the ear by multiplying the determined number of grains by a calibration factor.

As mentioned above, the system can be part of a server system that receives the digital image(s) from a digital camera—for example a smartphone. On the other hand, it is also possible—if corresponding computing power is available—to integrate the entire system into the mobile system, for example into a smartphone or a digital camera.

Figure 13:
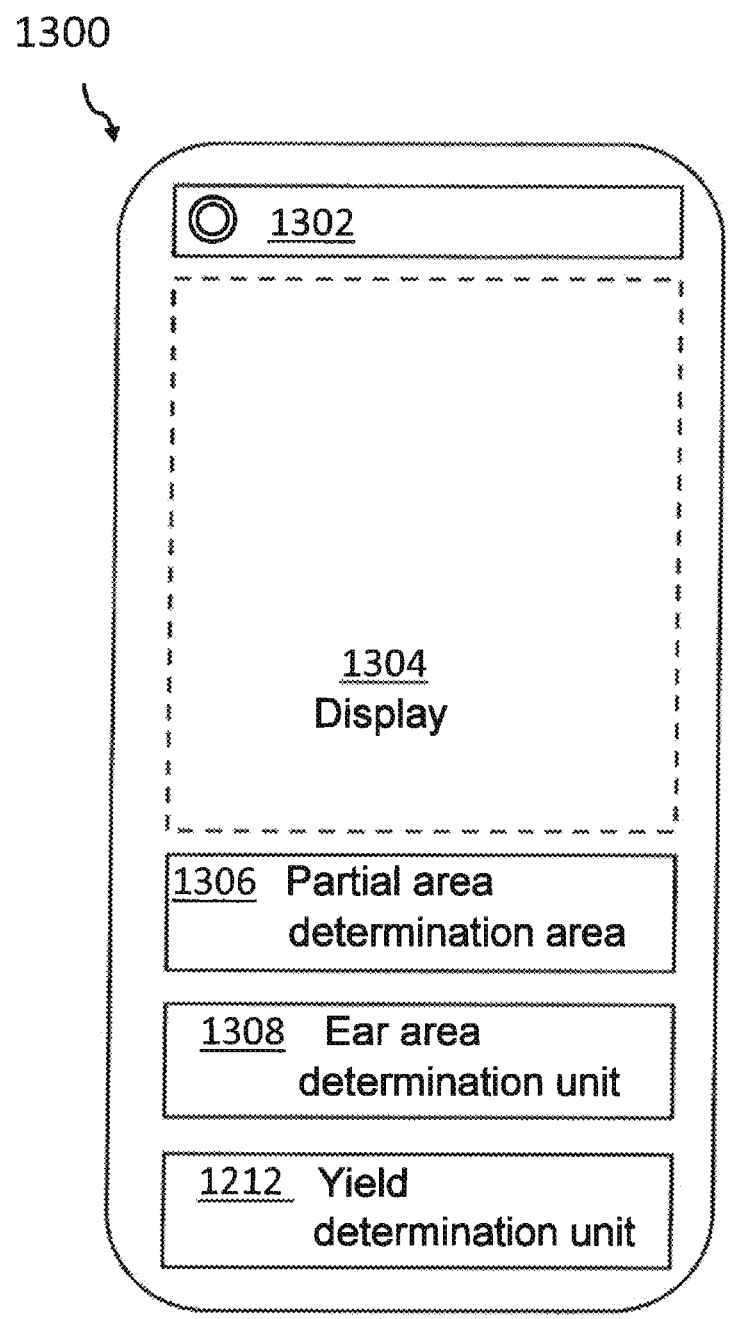
FIG. 13 shows a block diagram of a system for predicting the yield of a cornfield.

This system according to FIG. 12 can be integrated with a system 1300 for yield analysis of the cornfield shown in FIG. 13. This system comprises a digital camera 1302 that is positioned at a defined distance above an average plane of ears of a cornfield, wherein the digital camera is adapted for capturing a digital image of a section of the cornfield with the positioned digital camera, which can be the same as that shown in FIG. 12. The average plane of the ears and an image plane of the digital camera should lie parallel to each other. The display/screen 1304 can also be identical to the display unit 1204 of FIG. 12.

The system for yield prediction 1300 further comprises a partial area determination unit 1306 for determining the area of the captured cornfield section from the defined distance and a viewing angle of the digital camera and an ear area determination unit 1308 for determining the total area of the ears in the digital image compared to the total area of the digital image by means of an algorithm for differentiating between image pixels of the ears and other image pixels that do not belong to the ears.

Finally, the system 1300 comprises a yield determination module 1310 for determining the yield of the field from the total area of the ears in the digital image compared to the total area of the digital image, the determined area of the captured cornfield section, the average grain weight of an ear, a total field area and the first calibration factor.

Figure 14:
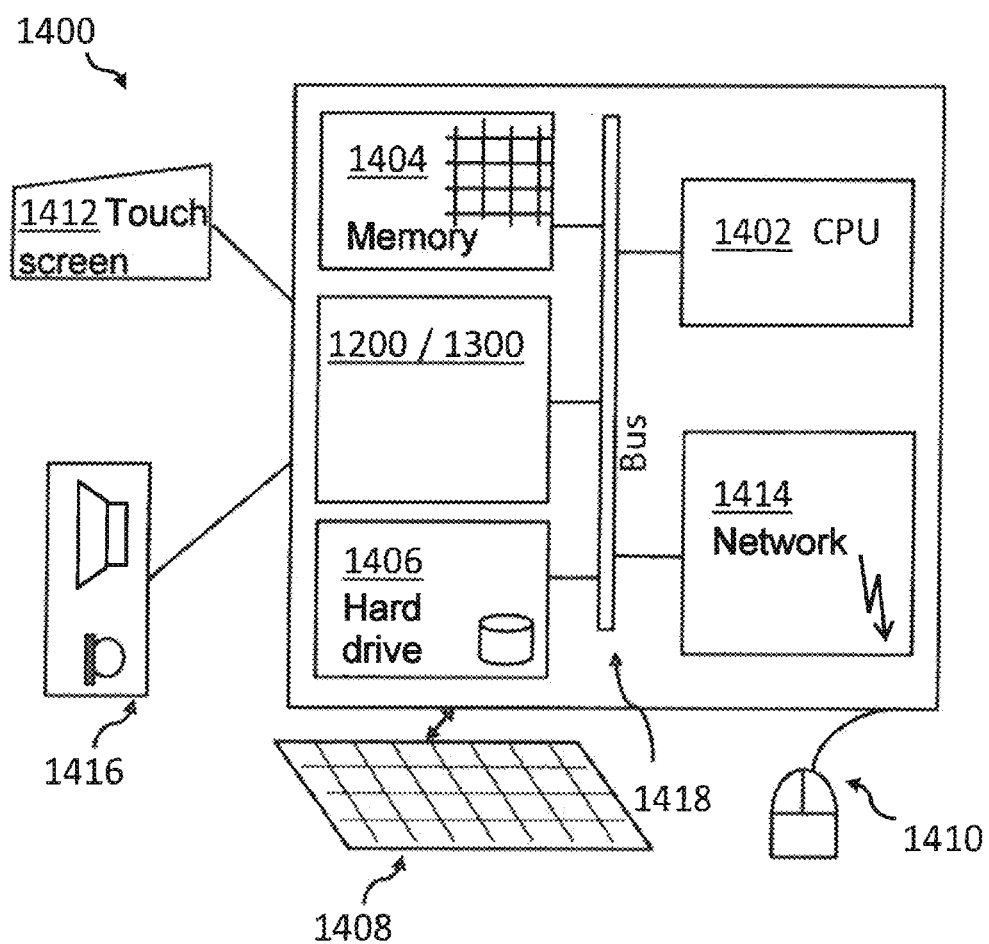
FIG. 14 shows a block diagram of an example of a computer system together with the system corresponding to FIG. 13 and/or FIG. 12.

Embodiments of the invention can be implemented together with virtually every type of computer—in particular also with a smartphone—independently of the platform used for storing and executing the program code. FIG. 14 shows an example of a computer system 1400 that is suitable for implementation of program code relating to the proposed method.

The computer system 1400 is only an example of a suitable computer system, and it is not intended to represent a limitation of the scope of use or functionality of the invention described herein. On the contrary: the computer system 1400 is suitable for implementing any feature or any functionality of the examples described here. The computer system 1400 contains components that can work together with numerous other general or dedicated computer system environments and/or configurations.

Examples of known computer systems, environments and/or configurations that can be suitable for working with the computer system 1400 include, without being limited to, tablet computers, notebook computers and/or other mobile computing systems and/or smartphones, as well as multiprocessor systems, microprocessor-based systems, programmable consumer electronics or also digital cameras or PDAs (personal digital assistants).

The computer system 1400 is described here in a general context of instructions that can be executed by a computer system. In this case, it can also be program modules that are executed by the computer system 1400. Program modules generally comprise program routines, partial programs, objects, components, processing and/or decision logic, data structures, etc., that carry out a specified object or represent a specified abstract data type.

As mentioned above, the computer system 1400 can be implemented in the form of a "general purpose" computing system. The components of the computer system 1400—without being limited hereto—comprise one or a plurality of processing units 1402 (CPUs), a memory system 1404 and a system bus 1418 that connect different system components—including the main memory 1404 with the processor 1402.

The computer system 1400 also comprises various computer-readable media. Such media comprise all media that are accessible by the computer system 1400. This includes both volatile and non-volatile media, which can be either removable or integrally installed.

The main memory 1404 can also comprise computer-readable media in the form of a volatile memory. This can for example be a random access memory (RAM) or also a cache memory. The computer system 1400 can further comprise removable and non-removable storage media. The storage system 1412 can for example be capable of storing data on a non-removable memory chip. The storage media can be connected to the system bus 1406 by one or a plurality of data interfaces. As described in further detail below, the memory 1404 can comprise at least one program product including a plurality of program modules (at least one) that are configured or can configure the computer system such that the functions of the embodiments of the invention can be executed.

A program that comprises a plurality of program modules can be stored for example in the memory 1404, as can an operating system, one or a plurality of application programs, program modules and/or program data.

The computer system 1400 can further communicate with a plurality of external devices such as a keyboard 1408, a pointer instrument ("mouse") 1410, a display (not shown), etc. These devices can for example be combined in a touch-sensitive screen 1412 (touch screen) in order to allow interaction with the computer system 1400. The computer system 1400 can also comprise acoustic input/output devices 1416. Moreover, further connections may also be present in order to allow communication with one or a plurality of other data processing devices (modem, network connections, etc.). Moreover, such communication can take place via input/output (I/O) interfaces. Furthermore, the computer system 1400 can communicate via one or a plurality of networks—such as a LAN (local area network), a WAN (wide area network) and/or a public (mobile) network (e.g. the Internet) via the adaptor 1414. As shown, the network adapter 1414 can communicate with other components of the computer system 1400 via the system bus 1418. Moreover, it should be noted—although this is not shown—that other hardware and/or software components can also be used in connection with the computer system 1400. These include e.g. micro code, device drivers, redundant processing units, etc.

Moreover, the system 1200 for determining a weight of all of the grains of an ear of a grain stalk or an individual or integrated system 1300 for predicting the yield of a cornfield can be connected to the bus system 1418. In this manner, the computer system or the system 1300 for determining the field yield (yield prediction) can receive the digital image, carry out determination of the weight of an ear and thus carry out a field yield prediction and send the result back to the mobile device with which the digital image(s) were captured. In a particular embodiment, the systems 1200 and or 1300 can also be integrated into a mobile computer system (e.g. a high-performance smartphone).

The description of the various embodiments of the present invention is provided for illustrative purposes. These embodiments are not intended to limit the scope of the inventive concept. Further modifications and variations are available to the person having ordinary skill in the art without constituting deviations from the core of the present invention.

The present invention can be implemented as a system, a method and/or a computer program product or a combination thereof. The computer program product can comprise a computer-readable storage medium (or simply a "medium") that contains computer-readable program instructions in order to cause a processor to implement aspects of the present invention.

This medium can be based on electronic, magnetic or electromagnetic waves, infrared light or semiconductor systems that are also suitable for transmission. This includes solid-state memory, random access memory (RAM) and read-only memory (ROM). The computer-readable program instructions described here can be downloaded onto the corresponding computer system by a potential service provider via a mobile network connection or a stationary network.

The computer-readable program instructions for implementing operations of the present invention can comprise any kind of machine-dependent or machine-independent instructions, micro code, firmware, status setting data, source code or object code written in any desired combination of one or a plurality of programming languages. The programming languages can be C++, Java or similar modern programming languages or conventional procedural programming languages such as the "C" programming language or similar programming languages. The computer-readable program instructions can be completely executed on the computer system. In other embodiments, electronic circuits such as e.g. programmable logic components, field-programmable gate arrays (PGAs) or programmable logic arrays (PLA) can execute the instructions using status information in the computer-readable program instructions to individualize the electronic circuit(s) in order to carry out aspects of the present invention.

Aspects of the present inventions are presented in this document by means of flow diagrams and/or block diagrams of methods, apparatuses (systems) and computer program products corresponding to the embodiments of the invention. It is understood that each block of the flow diagrams and/or block diagrams and combinations of blocks in the flow diagrams and or block diagrams shown can be implemented by computer-readable program instructions.

These computer-readable program instructions can be provided to a processor of a "general purpose computer" or special computer hardware or other programmable data processing devices in order to produce a machine such that the instructions executed by the respective processor generate means for implementing the functions/actions shown in the corresponding flow diagram and/or block diagram or blocks thereof. These computer-readable program instructions can also be stored on a computer-readable storage medium such that they cause a computer or a programmable data processing device to execute the instructions stored on the medium by means of the respective processor, so that aspects or actions of the method described in this document are carried out.

The invention claimed is:

1. A method for predicting the yield of a cornfield, wherein the method comprises
    positioning a digital camera at a defined distance above an average plane of ears of a cornfield,
    capturing a digital image of a cornfield section of the cornfield with the positioned digital camera, wherein the average plane of the ears and an image plane of the digital camera lie parallel to each other, determining an area of the captured cornfield section from the defined distance and a viewing angle of the digital camera, determining a total area of the ears in the digital image compared to a total area of the digital image by means of an algorithm for differentiating between image pixels of the ears and other image pixels that do not belong to the ears, and determining a yield of the cornfield from the total area of the ears in the digital image compared to the total area of the digital image, the determined area of the captured cornfield section, an average grain weight of an ear, a total field area and a first calibration factor.

2. The method as claimed in claim 1, wherein the algorithm for differentiating between image pixels of the ears and other image pixels is a local binary pattern algorithm.

3. The method as claimed in claim 1, wherein the algorithm for differentiating between image pixels of the ears and other image pixels is a method for texture image analysis.

4. The method as claimed in claim 1, wherein the algorithm for differentiating between image pixels of the ears and other image pixels is a brightness difference filter.

5. The method as claimed in claim 1, wherein the defined distance is determined by a spacer between the digital camera and an average plane of the ears of the cornfield, wherein the spacer is composed of a flexible element, one end of is attached to the digital camera and the other end of which comprises a color contrast ball that is positioned in the average plane of the ears of the cornfield.

6. The method as claimed in claim 1, wherein the defined distance is determined by a spacer between the digital camera and an average plane of the ears of the cornfield, wherein the digital camera is fastened at one end of the spacer at a prespecified angle that is not equal to 90°, wherein the other end of the spacer is positioned on an average plane of the ears of the cornfield, and wherein the digital image is captured when the image plane of the digital camera is horizontally aligned.

7. The method as claimed in claim 1, wherein the calibration factor comprises information on an average size of an ear on a digital image.

8. The method as claimed in claim 1, wherein the method comprises a step of
determining the number of ears on the digital image and/or in the cornfield section using the first calibration factor.

9. The method as claimed in claim 1, wherein determining the total area of the ears in the digital image compared to the total area of the digital image further comprises
applying to the areas of the ears an area factor, the value of which decreases from the center of the digital image to its edge.

10. The method as claimed in claim 1, wherein the average grain weight is determined by means of a method for determining a weight of all grains of an ear of a grain stalk, comprising
providing a digital image of the ear in a side view of the ear, wherein the ear in capturing the digital image is located in front of a reference card as a background,
determining a length of the ear along a longitudinal axis of the ear by separating image pixels of the digital image of the ear from a background of the digital image and comparing pixel coordinates at one end of the ear with pixel coordinates of the ear at an opposite end of the ear in a longitudinal direction of the ear by means of image marks on the reference card,
determining a number of spindle steps of the ear by means of a template matching method,
determining a number of grains of the ear by multiplying the determined number of spindle steps by a factor, and
determining the weight of all of the grains of the ear by multiplying the determined number of grains by a second calibration factor.

11. The method as claimed in claim 10, wherein the template matching method comprises
pixelwise displacement of an image template comprising a selected average partial area of the ear over the entire ear in a longitudinal direction of the ear and respective determination of a similarity factor of the image template with a respective covered ear section, thus giving rise to relative maxima in an x-y representation, wherein the x value represents an amount of displacement of the image template and the y value represents the similarity factor, and
determining a number of spindles from the x-y representation.

12. The method as claimed in claim 10, wherein determining the number of spindles from the x-y representation comprises
determining an average period length from distances of relative maxima from one another,
determining a number of spindles by dividing an ear length by a period length, and
determining a number of relative maxima.

13. The method as claimed in claim 1, wherein the average grain weight is determined by means of a grain weight determination method for determining a weight of all grains of an ear of a grain stalk, wherein the grain weight determination method comprises
providing a digital image of the ear in a flower view of the ear in front of the reference card,
determining an area of the flower view of the ear by separating image pixels of the digital image of the ear from the background by means of a color histogram process and comparing an area taken up by the ear by means of image marks on the reference card, and
determining the weight of all of the grains of the ear by multiplying the determined area of the ear by a second calibration factor.

14. The method as claimed in claim 13, wherein the second calibration factor comprises at least one dependency with respect to a factor selected from a group consisting of type, growth stage, weather, geographic location and fertilization status.

15. A system for predicting the yield of a cornfield, wherein the system comprises
a digital camera that is positioned at a defined distance above an average plane of ears of a cornfield, wherein the digital camera is adapted for capturing a digital image of a cornfield section of the cornfield with the positioned digital camera, wherein the average plane of the ears and an image plane of the digital camera lie parallel to each other,
a partial area determination unit for determining an area of the captured cornfield section from the defined distance and a viewing angle of the digital camera,
an ear area determination unit for determining a total area of the ears in the digital image compared to a total area of the digital image by means of an algorithm for differentiating between image pixels of the ears and other image pixels that do not belong to the ears, and a yield determination module for determining a yield of the cornfield from the total area of the ears in the digital image compared to the total area of the digital image, the area of the captured cornfield section, an average grain weight of an ear, a total field area and a calibration factor.

16. The system of claim 15, wherein the system further comprises a sending and receiving unit that is adapted for transmitting of the captured digital image of the cornfield section to a computer center, which comprises the partial area determination unit, the total area determination unit and the yield determination module.

17. A non-transitory computer-readable storage medium in which program elements for determining a weight of all of grains of an ear of a grain stalk are stored which, when they are executed by a processor, cause the processor to carry out a method with the following steps:

capturing a digital image of a cornfield section of a cornfield with a digital camera, wherein an average plane of ears and an image plane of the digital camera lie parallel to each other, and wherein the digital camera is positioned at a defined distance above an average plane of ears of a cornfield, determining an area of the captured cornfield section from the defined distance and a viewing angle of the digital camera, determining a total area of ears in the digital image compared to a total area of the digital image by means of an algorithm for differentiating between image pixels of the ears and other image pixels that do not belong to the ears, and determining a yield of the cornfield from the total area of the ears in the digital image compared to the total area of the digital image, the determined area of the captured cornfield section, an average grain weight of an ear, a total field area and a calibration factor.

18. The method as claimed in claim 1, wherein the calibration factor comprises information on an average size of an ear on a digital image and has at least one dependency with respect to one of the factors selected from the group consisting of type, growth stage, weather, geographic location and fertilization status.

* * * * *